(12) United States Patent
Kawaguchi et al.

(10) Patent No.: US 11,828,328 B2
(45) Date of Patent: Nov. 28, 2023

(54) BALL BEARING

(71) Applicant: NTN Corporation, Osaka (JP)

(72) Inventors: Hayato Kawaguchi, Shizuoka (JP); Nozomi Isobe, Shizuoka (JP)

(73) Assignee: NTN CORPORATION, Osaka (JP)

( * ) Notice: Subject to any disclaimer, the term of this patent is extended or adjusted under 35 U.S.C. 154(b) by 215 days.

(21) Appl. No.: 17/426,404

(22) PCT Filed: Jan. 23, 2020

(86) PCT No.: PCT/JP2020/002293
§ 371 (c)(1),
(2) Date: Jul. 28, 2021

(87) PCT Pub. No.: WO2020/158564
PCT Pub. Date: Aug. 6, 2020

(65) Prior Publication Data
US 2022/0099142 A1    Mar. 31, 2022

(30) Foreign Application Priority Data

Jan. 29, 2019  (JP) .................. 2019-013122
Feb. 20, 2019  (JP) .................. 2019-028541
Feb. 20, 2019  (JP) .................. 2019-028611

(51) Int. Cl.
*F16C 33/41*     (2006.01)
*F16C 19/06*     (2006.01)

(52) U.S. Cl.
CPC .............. *F16C 33/41* (2013.01); *F16C 19/06* (2013.01)

(58) Field of Classification Search
CPC .... F16C 33/3856; F16C 33/41; F16C 33/412; F16C 33/414; F16C 33/416; F16C 33/418;
(Continued)

(56) References Cited

U.S. PATENT DOCUMENTS 2,360,419 A * 10/1944 Hickling ............. F16C 33/3806
                                                    384/534
3,975,066 A    8/1976 Hofmann et al.
(Continued)

FOREIGN PATENT DOCUMENTS

DE      76 38 179       6/1977
EP      0 725 224       8/1996
(Continued)

OTHER PUBLICATIONS

Translation of JP7-25332 obtained Apr. 25, 2023.*
(Continued)

*Primary Examiner* — James Pilkington
(74) *Attorney, Agent, or Firm* — Wenderoth, Lind & Ponack, L.L.P.

(57) ABSTRACT

A ball bearing includes a cage made of a resin, pockets open to a side surface of the cage on a first axial side of the cage, and an outer bearing ring including a radially protruding engaging portion on a second axial side of a raceway surface. The cage includes an engagement portion disposed on a second axial side of the pockets so as to be engageable with the radially protruding engaging portion of the outer bearing ring in an axial direction. A relationship between an axial depth H of each of the pockets and a diameter d of a ball is $0.15d \geq H \geq 0.65d$.

22 Claims, 22 Drawing Sheets

(58) Field of Classification Search
CPC ... F16C 33/583; F16C 33/7823; F16C 33/785
See application file for complete search history.

(56) References Cited

U.S. PATENT DOCUMENTS

| | | | |
|---|---|---|---|
| 10,054,155 B2* | 8/2018 | Kamamoto | F16C 33/3843 |
| 10,151,346 B2* | 12/2018 | Kamamoto | F16C 33/416 |
| 2018/0106295 A1 | 4/2018 | Koda et al. | |
| 2019/0219102 A1 | 7/2019 | Sasaki et al. | |

FOREIGN PATENT DOCUMENTS

| | | | |
|---|---|---|---|
| JP | 7-25332 | * | 5/1995 |
| JP | H10-2326 | | 1/1998 |
| JP | 2002-213458 | | 7/2002 |
| JP | 2005-133818 | | 5/2005 |
| JP | 2007-285506 | | 11/2007 |
| JP | 2007-327516 | | 12/2007 |
| JP | 2008-19999 | | 1/2008 |
| JP | 2009-174603 | * | 8/2009 |
| JP | 2010-31947 | | 2/2010 |
| JP | 2010-127323 | | 6/2010 |
| JP | 2013-200006 | | 10/2013 |
| JP | 2014-169777 | | 9/2014 |
| JP | 2016-169766 | | 9/2016 |
| JP | 2017-219058 | | 12/2017 |
| JP | 2018-40445 | | 3/2018 |
| WO | 2017/150544 | | 9/2017 |
| WO | 2018/086650 | | 5/2018 |

OTHER PUBLICATIONS

Extended European Search Report dated Feb. 7, 2022 in corresponding European Patent Application No. 20748495.7.
English Translation of International Preliminary Report on Patentability dated Jul. 27, 2021 in corresponding (PCT) International Application No. PCT/JP2020/002293.

* cited by examiner

BALL BEARING

TECHNICAL FIELD

The present invention relates to a ball bearing including a cage made of a resin.

BACKGROUND ART

Electric motors used in today's electric vehicles (EV) and plug-in hybrid electric vehicles (PHEV) are rotated at a higher speed so as to generate a driving force comparable to the driving force in engine-driven vehicles. In order to support the shaft of such an electric motor which rotates at a high speed, a ball bearing suitable for high-speed rotation/operation is used.

In ball bearings for high-speed operation, a cage made of resin is sometimes used, and, especially if the bearing assemblability or the bearing costs are important, a crown-shaped cage is used. Generally, a crown-shaped cage has a plurality of pockets open to the inner and outer peripheries and the side surface of the cage on its one axial side, and having concave curved surfaces to wrap the balls. The opening widths of the pockets on the side surface of the cage on its one axial side are smaller than the diameters of the balls. By pushing, in the one axial direction, the open edges of the pockets on the side surface of the cage on its one axial side against the balls disposed between the outer and inner raceway surfaces, the cage is elastically deformed such that the above opening widths widen, and the balls are received into the pockets through the widened openings. The pockets, once being elastically restored, are engageable with the balls in the other axial direction so as to restrict the movement of the cage in the other axial direction.

With a general crown-shaped cage, a problem is caused by its deformation due to a centrifugal force during high-speed rotation. Specifically, since the protruding portions of the cage extending in the one axial direction so as to define the pockets are cantilevered portions, the pockets are radially outwardly inclined in the one axial direction due to a centrifugal force, thereby twisting the annular portion of the cage. This causes the pockets to interfere with the balls or the outer bearing ring, and this interference may cause wear dust or abnormal heat generation, or shorten the service life of the bearing.

In order to reduce such an influence of centrifugal force, in the crown-shaped cage of the below-identified Patent Document 1, the axial thicknesses of the intermediate portions of the cage between the respective circumferentially adjacent pairs of pockets are decreased to reduce the weight of the protruding portions of the cage defining the pockets, while ensuring the axial depths of the pockets. Also, the axial thicknesses of the intermediate portions are set to be larger than the axial thicknesses of the pockets at their bottoms, thereby ensuring the strength of the cage.

The cage of the below-identified Patent Document 2 is constituted by a crown-shaped cage body and an anti-deformation metal member attached to the distal ends of protruding portions of the cage body, thereby preventing the protruding portions from being inclined radially outwardly due to a centrifugal force.

In the crown-shaped cage of the below-identified Patent Document 3, the protruding portions of the cage defining the pockets have an outer diameter which gradually decreases from the axially intermediate portions of the protruding portions toward the distal ends thereof, thereby decreasing the weight of the cage so that the cage is less likely to be affected by a centrifugal force. Also, because this cage is designed such that the balls and the pockets come into contact with each other at radially inward positions of the pitch circle diameter of the balls, the radially inward forces from the balls are applied to the cage, thereby reducing deformation of the cage during high-speed rotation.

PRIOR ART DOCUMENT(S)

Patent Document(s)

Patent document 1: Japanese Unexamined Patent Application Publication 2016-169766
Patent document 2: Japanese Unexamined Patent Application Publication 2007-285506
Patent document 3: Japanese Unexamined Patent Application Publication 2013-200006

SUMMARY OF THE INVENTION

Problems to be Solved by the Invention

However, in order to restrict the movement of a cage in the other axial direction by means of the engagement of the pockets and the balls as in Patent Document 1, the pockets need to be each designed to have a sufficient length in the one axial direction from the center of the ball. Therefore, the distal end portions of the pockets are likely to be affected by a centrifugal force, and thus there is a limit to reducing deformation of the cage due to centrifugal force.

Also, if an anti-deformation member is attached to a crown-shaped cage body so that the cage can resist a centrifugal force as in Patent Document 2, an additional assembling step, an additional component cost, etc. are required, so that high costs are required. Further, the anti-deformation member may separate from the cage body.

Also, as in Patent Document 3, by designing the cage such that the protruding portions of the cage defining the pockets have an outer diameter which gradually decreases from the axially intermediate portions of the protruding portions toward the distal ends thereof, it is possible to reduce the influence of centrifugal force. However, in this case, too, the movement of the cage in the other axial direction is restricted by means of the engagement of the pockets and the balls as in Patent Document 1. Also, in a case where the deformation of the cage is reduced by applying to the pockets the radially inward forces from the balls, if the cage is deformed due to the influence of centrifugal force, this directly results in the radially inner sides of the pockets at their distal end portions strongly coming into contact with the balls, which could in turn cause abnormal wear at the above contact areas.

Today's electric motors of EVs and PHEVs are rotated at increasingly high speeds, and the dmn (ball pitch circle diameter X the number of rotations per minute) value of a ball bearing supporting the rotary shaft of such an electric motor may exceed 2 million. In order to provide a ball bearing suitable for such a high-speed rotation, since it is important to take, in addition to a countermeasure against a centrifugal force for preventing abnormal heat generation, a countermeasure against normal heat generation, even shear resistance of lubricating oil between the cage and the balls could be a problem. This is because, if the temperature of the cage can be kept at 120 degrees Celsius or less, a relatively inexpensive engineering plastic can be used, whereas, if the temperature of the cage exceeds 120 degrees, a relatively expensive super engineering plastic needs to be used in view of the heat resistance of the resin.

In view of the above backgrounds, it is an object of the present invention to provide a ball bearing in which the pockets of the cage made of resin are open to the side surface of the cage on its one axial side, and in which it is possible to reduce deformation of the cage due to a centrifugal force, and to reduce the shear resistance of lubricating oil between the pockets and the balls.

Means for Solving the Problems

As a first means for achieving the above object, the present invention provides a ball bearing comprising: an outer bearing ring having an outer raceway surface on an inner periphery of the outer bearing ring; an inner bearing ring having an inner raceway surface on an outer periphery of the inner bearing ring; a plurality of balls disposed between the outer raceway surface and the inner raceway surface; and a cage which is made of a resin, and by which the balls are arranged at equal intervals in a circumferential direction wherein the cage has, in plural circumferential portions of the cage, pockets maintaining circumferential positions of the balls, and wherein the pockets are open to a side surface of the cage on one side thereof in one axial direction, characterized in that at least one bearing ring of the outer bearing ring and the inner bearing ring includes a radially protruding engaging portion at a position of the inner or outer periphery thereof on one side of the raceway surface thereof, in the other axial direction, wherein the cage includes at least one engagement portion engageable with the engaging portion in the other axial direction, wherein a relationship between a pocket axial depth H of each of the pockets and a ball diameter d of a corresponding one of the balls is set at $0.15d \leq H \leq 0.65d$, and wherein the at least one engagement portion is disposed on one side of the pockets, in the other axial direction.

According to the structure of the above first means, since it is possible to restrict the movement of the cage in the other axial direction by means of the engagement of the at least one engagement portion of the cage and the engaging portion of the at least one bearing ring, it is possible to set the relationship between the pocket axial depth H and the ball diameter d at $H \leq 0.65d$. If this relationship is set at $H > 0.65d$, since the pockets will have a depth similar to that of a conventional example, and enabling the movement of the cage in the other axial direction to be restricted by means of only the engagement of the pockets and the balls, it will be unnecessary to use the engaging portion and the at least one engagement portion for restricting such a cage movement. Also, if the above relationship is set at $H < 0.15d$, it will be difficult for the pockets to maintain the circumferential positions of the balls. By forming the engaging portion on the other axial side of the raceway surface of the at least one bearing ring, and forming the corresponding at least one engagement portion on the other axial side of the pockets of the cage so as not to be present on the protruding portions of the cage defining the pockets, while the ball bearing is rotating at a high speed, the centrifugal force applied to the at least one engagement portion is less likely to cause the pockets to come into abnormal contact with the balls. By setting the depth H at $H \leq 0.65d$ with these engagement portions disposed as described above, it is possible to shorten the axial lengths of the protruding portions of the cage, and thus to reduce their weight Therefore, while the bearing is rotating at a high speed, the cage is less likely to be affected by a centrifugal force, so that it is possible to reduce the deformation of the cage due to a centrifugal force, and also to reduce the shear resistance of lubricating oil between the pockets and the balls.

The relationship between the pocket axial depth H and the ball diameter d is preferably set at $H < 0.5d$. By setting the above relationship in this way, it is possible to further reduce the above shear resistance, and the deformation of the cage due to a centrifugal force.

It is preferable that the at least one engagement portion includes protrusions defining, between the protrusions and the engaging portion, spaces which narrow in axial dimension in the circumferential direction, and that an axial clearance is defined between the engaging portion and the protrusions. With this arrangement, since an axial clearance is between the engaging portion and the at least engagement portion, an oil film is formed between the surfaces of the engaging portion and the at least engagement portion that are circumferentially slidable relative to each other. Also, the protrusions draw lubricating oil into the narrow portions of the above spaces, thereby producing wedge effect by which dynamic pressure is generated. This in turn promotes the growth of the oil films, and thus prevents wear of the engaging and engagement portions. Also, when the difference in peripheral speed between the engaging portion and the at least engagement portion becomes large, the thickness of the oil film increases to such an extent that the engaging portion and the at least engagement portion are completely separated from each other by the oil film. In other words, when the above difference in peripheral speed becomes a predetermined value or more, the friction condition between the engaging portions and the at least engagement portion becomes fluid lubrication condition. In this lubrication condition, because, when the engaging portion and the at least engagement portion restrict the movement of the cage in the other axial direction, they engage with each other via the oil film, it is possible to prevent wear of the engaging and engagement portions.

It is preferable that an axial clearance is defined between the at least one engagement portion and the engaging portion, and that the at least one engagement portion and the engaging portion have two surfaces, respectively, which are circumferentially slidable relative each other, the two surfaces each having an arithmetic mean roughness Ra of 0.2 μm or less. Since an axial clearance is between the engaging portion and the at least engagement portion, if the ball bearing is lubricated by lubricating oil, an oil film is formed between the surfaces of the engaging portion and the at least engagement portion that are circumferentially slidable relative to each other. Especially if the ball bearing rotates at a high speed, since the difference in peripheral speed between the two surfaces increases, it is expected that the minimum oil film thickness hmin between the two surfaces becomes 1.5 μm or more. Since it can be considered that the surface properties of the two surfaces follow a normal distribution, by setting the arithmetic mean roughness Ra (μm) of each of the two surfaces at 0.2 or less, the friction condition of oil film parameter $\Lambda > 3$ can be expected. Since it is considered that the friction condition between the two surfaces substantially becomes fluid lubrication condition in case of $\Lambda > 3$, it is possible to prevent wear of the engaging portion and the at least engagement portion.

The at least one engagement portion of the cage preferably comprises two or more engagement portions disposed at two or more circumferentially spaced apart portions of the cage. With this arrangement, since, when mounting the cage between the outer and inner bearing rings, the engagement portions can be easily freed from the engaging portion, it is possible to easily force the engagement portions to move over the engaging portion.

The engaging portion preferably has a chamfer shaped such that a difference in diameter between the chamfer and a distal end of the engaging portion gradually increases from the distal end of the engaging portion in the other axial direction. With this arrangement, since, when mounting the cage between the outer and inner bearing rings, the engagement portions can be easily freed from the engaging portion while sliding on the engaging portion, it is possible to easily force the engagement portions to move over the engaging portion.

The at least one engagement portion is preferably shaped such that a difference in its diameter from a distal end of the engagement portion gradually increases from the distal end of the engagement portion in the one axial direction. With this arrangement, since, when mounting the cage between the outer and inner bearing rings, the engagement portion can be easily freed from the engaging portion while sliding on the engaging portion, it is possible to easily force the engagement portion to move over the engaging portion.

It is preferable that the engaging portion has a receiving surface inclined, at an inclination angle of 10 degrees or less, in the other axial direction and radially toward the distal end of the engaging portion, and that the at least one engagement portion is engageable with the receiving surface in the other axial direction. With this arrangement, since, when the engagement portion of the cage engages with the engaging portion of the bearing ring in the other axial direction, the engagement portion cannot be easily freed from the engaging portion, it is possible to prevent the cage from moving out of the bearing in the other axial direction.

It is preferable that the at least one bearing ring has a groove at a position of the inner or outer periphery thereof on the one side of the raceway surface thereof, in the other axial direction, the groove having a depth in the radial direction, and extending continuously around an entire circumference of the at least one bearing ring, and that the engaging portion constitutes, of the inner or outer periphery having the raceway surface, a portion from an end thereof in the other axial direction to a bottom of the groove. With this arrangement, it is possible to use a seal-attaching groove of a general bearing ring as the groove of the at least one bearing ring, and to use the portion of this general bearing ring on the other side of the seal-attaching groove as the engaging portion of the at least one bearing ring, so that the axial layout of a general ball bearing can be used.

It is preferable that each of the outer bearing ring and the inner bearing ring includes the engaging portion, and that the cage includes the at least one engagement portion which constitutes each of an outer engagement portion and an inner engagement portion, the outer engagement portion corresponding to the engaging portion of the outer bearing ring, and the inner engagement portion corresponding to the engaging portion of the inner bearing ring. With this arrangement, it is possible to restrict the movement of the cage in the other axial direction by means of both the engagement of the outer engagement portion of the cage and the engaging portion of the outer bearing ring, and the engagement of the inner engagement portion of the cage and the engaging portion of the inner bearing ring. Therefore, it is possible to more reliably prevent the cage from moving out of the bearing in the other axial direction.

As a second means for achieving the above object, the present invention provides a ball bearing comprising: an outer bearing ring having an outer raceway surface; an inner bearing ring having an inner raceway surface; a plurality of balls disposed between the outer raceway surface and the inner raceway surface; and a cage which is made of a resin, and by which the balls are arranged at equal intervals in a circumferential direction, wherein the cage has, at a plurality of circumferential portions of the cage, pockets maintaining circumferential positions of the balls, and wherein the pockets are open to a side surface of the cage on its side in one axial direction, characterized in that the ball bearing further comprises an engaging member attached to one bearing ring of the outer bearing ring and the inner bearing ring, wherein the engaging member includes an opposed portion disposed on one side of the cage in the other axial direction so as to restrict movement of the cage in the other axial direction, and wherein a relationship between a pocket axial depth H of each of the pockets and a ball diameter d of a corresponding one of the balls is set at $0.15d \leq H \leq 0.65d$.

According to the structure of the above second means, it is possible to restrict the movement of the cage in the other axial direction by means of the engagement of the cage and the opposed portion of the engaging member attached to the one bearing ring. Therefore, it is possible to set the relationship between the pocket axial depth H and the ball diameter d at $H \leq 0.65d$. By setting this relationship at $H \leq 0.65d$, it is possible to shorten the axial lengths of the protruding portions of the cage, and thus to reduce their weight. Therefore, while the bearing is rotating at a high speed, the cage is less likely to be affected by a centrifugal force, so that it is possible to reduce the deformation of the cage due to a centrifugal force, and also to reduce the shear resistance of lubricating oil between the pockets and the balls. Also, if the above relationship is set at $H>0.65d$, since the pockets will have a depth similar to that of a conventional example, and enabling the movement of the cage in the other axial direction to be restricted by means of only the engagement of the pockets and the balls, it will be unnecessary to use the opposed portion for restricting such a cage movement. Also, if the above relationship is set at $H<0.15d$, it will be difficult for the pockets to maintain the circumferential positions of the balls.

The relationship between the pocket axial depth H and the ball diameter d is preferably set at $H<0.5d$. By setting the above relationship in this way, it is possible to further reduce the above shear resistance, and the deformation of the cage due to a centrifugal force. Also, in case of $H<0.5d$, since the cage does not include, at its pockets, claws for holding the balls as seen in a conventional cage, it is possible to place the balls into the pockets by simply placing the cage at a predetermined position.

It is preferable that an axial clearance is defined between the engaging member and the cage, that one of the cage and the opposed portion of the engaging member includes two or more protrusions each defining, between the protrusion and the other of the cage and the opposed portion, spaces which narrows in axial dimension in the circumferential direction, and that the two or more protrusions are spaced apart from each other in the circumferential direction. With this arrangement, since an axial clearance is between the cage and the engaging member, lubricating oil flows between the opposed side surfaces of the cage and the opposed portion of the engaging member, and oil films are formed. Also, between the above two side surfaces, when, by the protrusions on the side surface of the one of the cage and the opposed portion, lubricating oil is drawn to the narrow portions of the wedge-shaped spaces between the protrusions and the side surface of the other of the cage and the opposed portion, since wedge effect is produced to generate dynamic pressure, it is possible to promote the growth of the oil films, and thus to prevent wear of the cage and the opposed portion. If the larger the number of the protrusions, the larger the difference in peripheral speed between the cage and the engaging member, since the circumferentially spaced apart protrusions draw lubricating oil while circumferentially rotating at a high speed, an oil film extending continuously in the circumferential direction is formed on the side surface of the other of the cage and the opposed portion, and the wedge effect between the cage and the side surface of the other thereof is produced without interruption. Thus, the thickness of the oil film increases to such an extent that the protrusions and the side surface of the other of the cage and the opposed portion are completely separated from each other by the oil film. In other words, when the above difference in peripheral speed becomes a predetermined value or more, the friction condition between the engaging member and the cage becomes fluid lubrication condition. In this lubrication condition, it is possible to restrict the movement of the cage in the other axial direction by means of the non-contact engagement of the opposed portion of the engaging member and the cage via the oil film. Therefore, it is possible to prevent the above wear.

The two or more protrusions are preferably formed on the cage. With this arrangement, it is only required to prepare, as the cage, a cage integrally formed with these protrusions. Thus, it is possible to use, as the engaging member, a general-purpose component.

For example, it is preferable that the one bearing ring has, on one side of the raceway surface of the one bearing ring, in the other axial direction, a shield groove having a depth in a radial direction, and extending continuously around an entire circumference of the one bearing ring, and that the engaging member comprises a shield formed of a metal plate, and attached to the shield groove. With this arrangement, it is possible to use, as the one bearing ring and the shield, a bearing ring and a shield for a general ball bearing with a shield. Also, since the engaging member functions as a shield, too, it is possible to prevent lubricating oil from excessively flowing into the bearing from outside the bearing by using the engaging member, and thus to reduce the stirring resistance of lubricating oil due to the balls.

The opposed portion of the engaging member preferably includes a rib formed on the metal plate so as to define a circumferentially extending groove. With this arrangement, it is possible to improve, by means of the rib, the deformation resistance of the opposed portion when restricting the movement of the cage, and thus to reduce the inclination of the opposed portion. Also, since the rib functions as a groove in which lubricating oil remains, it is possible to promote oil film formation, too.

It is preferable that the one bearing ring has, on one side of the raceway surface of the one bearing ring, in the other axial direction, a seal groove having a depth in a radial direction, and extending continuously around an entire circumference of the one bearing ring, and that the engaging member comprises a seal attached to the seal groove, and constituted by: a metal core formed of a metal plate; and an elastomer attached to the metal core. With this arrangement, it is possible to prepare the one bearing ring and the engaging member based on the specifications of a bearing ring and a seal for a known ball bearing with a seal, and thus to reduce the cost. This is because the structure of the bearing ring including a seal groove, and the structure of the seal press-fitted and attached to the seal groove, and constituted by a metal core formed of a metal plate and an elastomer are general structures in a ball bearing with a seal.

In a case where the engaging member comprises the seal, too, in order to prevent wear of the cage and the opposed portion, it is preferable that an axial clearance is defined between the engaging member and the cage, and that one of the cage and the opposed portion includes two or more protrusions.

For example, the opposed portion of the engaging member preferably includes the two or more protrusions, the protrusions being portions of the elastomer. With this arrangement, when forming the elastomer, it is possible to form the protrusions, too. Therefore, it is possible to improve the dimensional accuracy of the protrusions, compared to forming the protrusions on the metal core by pressing.

It is preferable that the other bearing ring of the outer bearing ring and the inner bearing ring, which is opposed to the one bearing ring, has a seal sliding surface extending continuously around an entire circumference of the other bearing ring, that the engaging member includes a seal lip which is a portion of the elastomer and circumferentially slidable relative to the seal sliding surface, and that the seal lip includes two or more elastic protrusions each defining, between the elastic protrusion and the seal sliding surface, a space which narrows in radial dimension in the circumferential direction, and the two or more elastic protrusions are spaced apart from each other in the circumferential direction, to define, between respective circumferentially adjacent pairs of the elastic protrusions, oil paths communicating with an interior and an exterior of the ball bearing. With this arrangement, when, due to the rotation of the bearing, the elastic protrusions of the seal lip draw lubricating oil in the oil paths, to the narrow portions of the wedge-shaped spaces between the seal sliding surface and the respective elastic protrusions, the wedge effect is produced, and thus oil film formation is promoted. When the difference in peripheral speed between the engaging member and the other bearing ring becomes a predetermined value or more, the friction condition between the seal lip and the seal sliding surface becomes a fluid lubrication condition. Therefore, it is possible to reduce wear of the seal lip, reduce seal torque to the same level as the case where a non-contact type of seal is used as the engagement portion, and deal with high-speed rotation of the ball bearing. Also, since the particle sizes of foreign objects allowed to pass through the oil paths can be set based on the heights of the elastic protrusions, it is also possible to prevent the entry of foreign objects having predetermined particle sizes.

The cage is preferably formed of an engineering plastic. Since, as described above, it is possible to prevent abnormal heat generation and reduce heat generation due to shear resistance by reducing the deformation of the cage due to a centrifugal force, it is possible to avoid using a super engineering plastic, which is more expensive than an engineering plastic, and thus to reduce the cost for manufacturing the cage.

Effects of the Invention

As described above, by using the structure of the first or second means of the present invention, it is possible to reduce the deformation of the cage due to a centrifugal force, and also to reduce the shear resistance of lubricating oil between the pockets and the balls.

BEST MODE FOR CARRYING OUT THE INVENTION

The first embodiment, which is an exemplary ball bearing according to the above first means of the present invention, is now described with reference to FIGS. 1 to 5.

Figure 1:
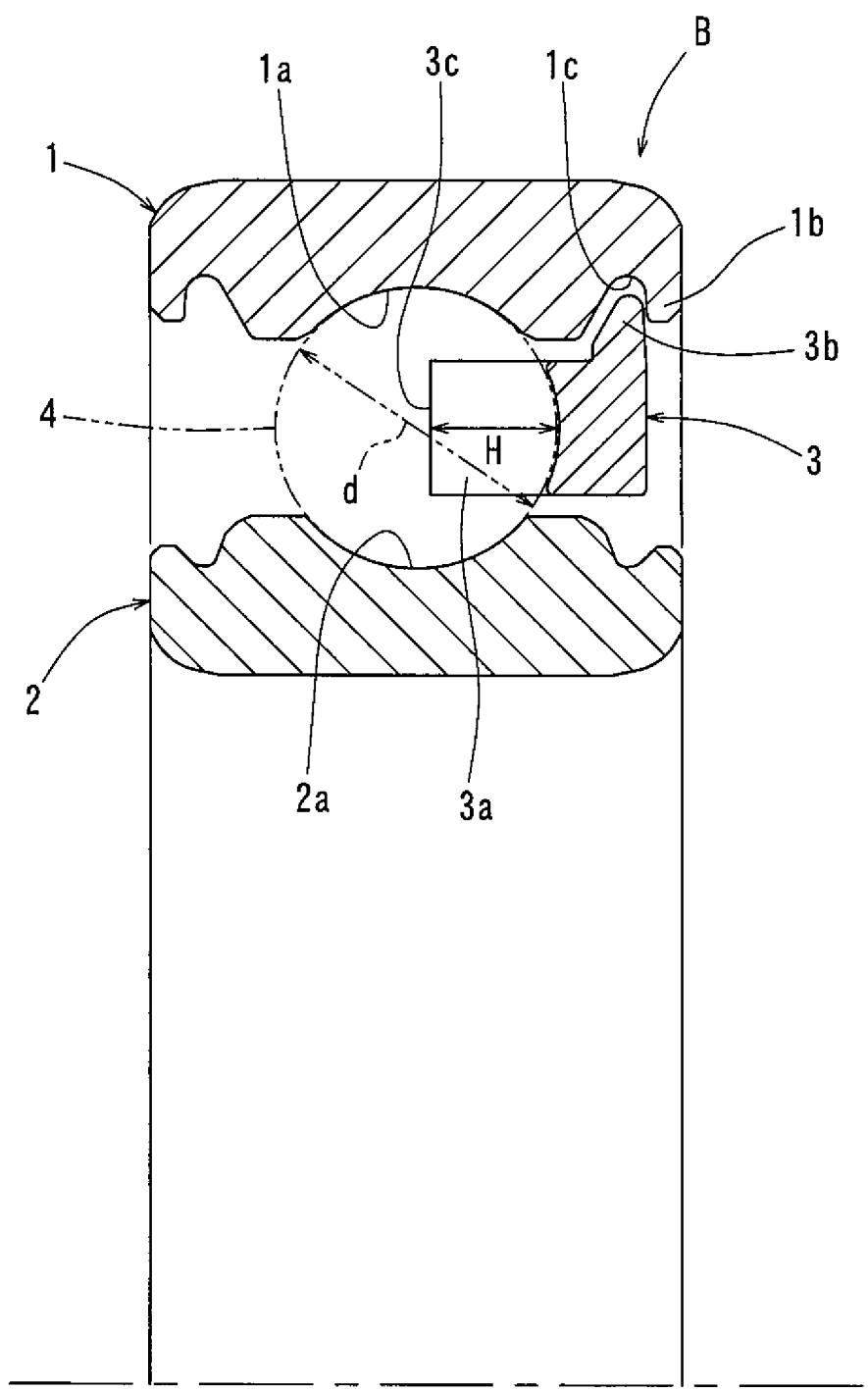
FIG. 1 is a sectional view of a ball bearing according to a first embodiment of the present invention.

The ball bearing B illustrated in FIG. 1 includes an outer bearing ring 1; an inner bearing ring 2 arranged coaxially with the outer bearing ring 1; a cage 3 arranged coaxially with the outer and inner bearing rings 1 and 2; and a plurality of balls 4 arranged at predetermined pitches in the circumferential direction by the cage 3.

As used herein, the terms "axial" and "axially" are related to the direction along the rotation center axis of the cage; the terms "circumferential" and "circumferentially" are related to the direction along a circumference about the rotation center axis of the cage; the terms "radial" and "radially" are related to a direction orthogonal to the rotation center axis of the cage; the terms "one axial" and "the other axial" are related to one and the other of the two opposite axial directions of the cage, respectively; and the terms "inner diameter" and "outer diameter" refer to the respective diameters of an imaginary inscribed circle and an imaginary circumcircle both concentric with the rotation center axis of the cage. In FIG. 1, the right-and-left direction corresponds to the axial direction with the left side considered here as the one axial side and the right side as the other axial side. The vertical direction in FIG. 1 corresponds to a radial direction with the upward direction corresponding to a radially outward direction and the downward direction corresponding to a radially inward direction.

The outer bearing ring 1 is an annular bearing component having an inner periphery including an outer raceway surface 1a. The inner bearing ring 2 is an annular bearing component having an outer periphery including an inner raceway surface 2a.

The bearing rings 1 and 2 and the balls 4 are all made of steel.

The outer raceway surface 1a and the inner raceway surface 2a each comprises a raceway groove having a circular arc-shaped cross section, and disposed in the central portion of the bearing ring in its width direction. In the shown example, the ball bearing B is a deep groove ball bearing.

Generally, one of the outer and inner bearing rings 1 and 2 is fixed to a rotary shaft (not shown) so as to rotate in unison (integrally) with the rotary shaft, and the other bearing ring is fixed to a housing (not shown) which is stationary relative to the rotary shaft. It is assumed here that the ball bearing B shown is operable at 2.2 million dmn. Use of the bearing B for such high speed operation includes, for example, supporting a rotary shaft 5a of a motor 5 on a housing 6 for rotation relative to the housing 6, as conceptually illustrated in FIG. 2. The motor 5 is, e.g., an electric motor for driving an automobile.

As illustrated in FIG. 1, the balls 4 are disposed between the outer raceway surface 1a and the inner raceway surface 2a. The balls 4 are circumferentially equidistantly spaced apart from each other by the cage 3.

Figure 3:
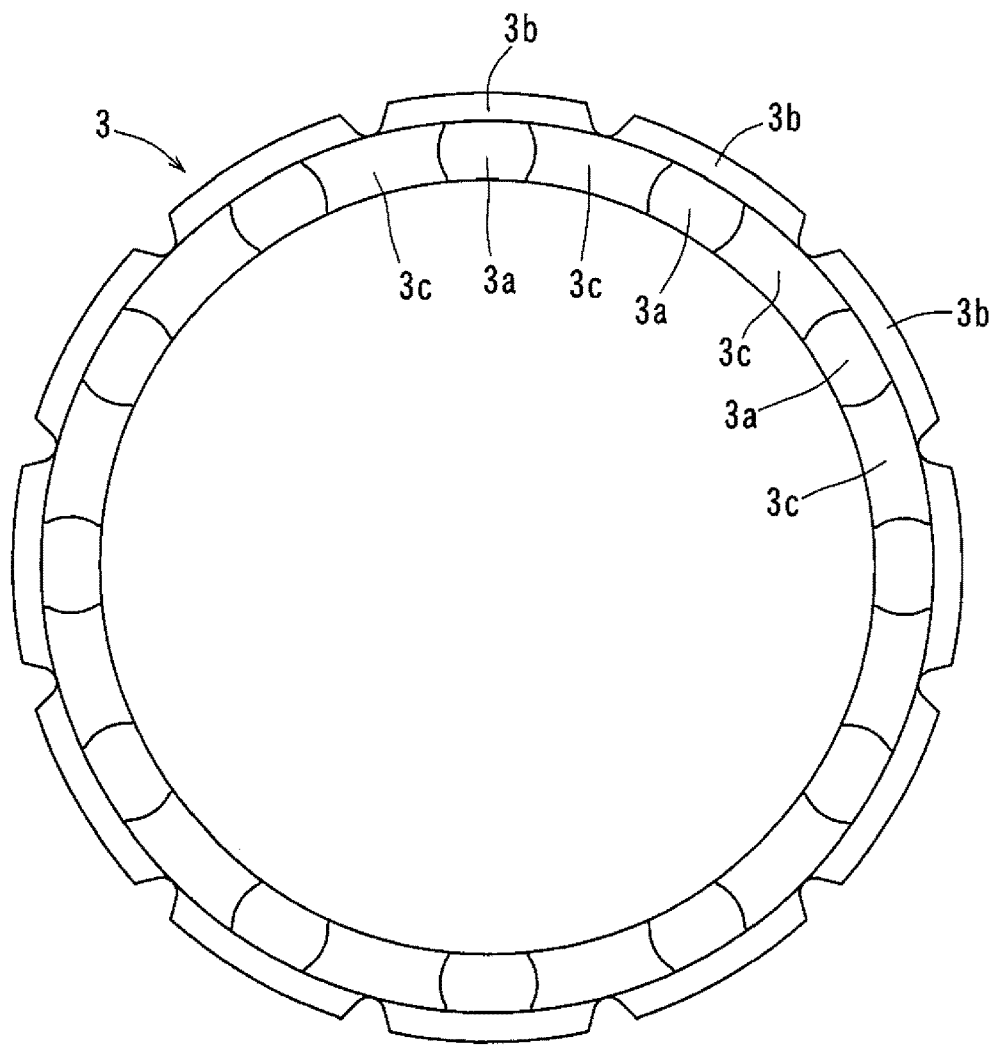
FIG. 3 is a left side view of a cage according to the first embodiment.
Figure 4:
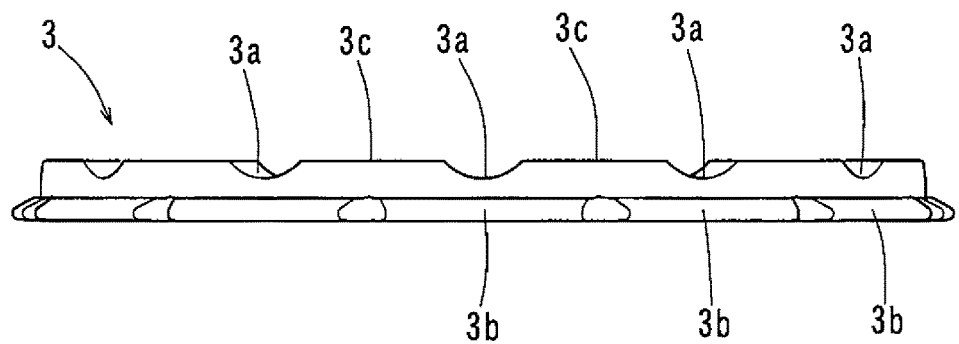
FIG. 4 is a plan view of the cage illustrated in FIG. 3.

As illustrated in FIGS. 1, 3 and 4, the cage 3 refers to the whole of a bearing component having, in its plural circumferential portions, pockets 3a maintaining the circumferential positions of the balls 4, the bearing component comprising an integral component so as to be circumferentially rotatable in unison with the pockets 3a as the balls 4 revolve around the center axis of the bearing.

The cage 3 is made of resin, which means here that the cage is entirely made of resin. The word "resin" herein used refers to a single resin material, two or more resin materials mixed together, or at least one resin material as a matrix in which a reinforcing material (such as glass fiber or carbon fiber) is mixed (so-called fiber-reinforced resin). If the ball bearing is designed to allow 2.2 million dmn rotation, the cage is preferably made of a fiber-reinforced resin.

An engineering plastic (or plastics) is used as the resin of the cage 3. Engineering plastics generally refer to plastics having a heat resistance of not less than 100° C. and not more than 120° C., a strength of not less than 50 MPa, and a flexural modulus of not less than 2.4 GPa.

Engineering plastics mainly include, e.g., polyamide (PA, PA6, PA9, PA46, PA66), polyacetal (POM), polycarbonate (PC), and polybutylene terephthalate (PBT). Fiber-reinforced resins include (PA46 or 66+glass fiber) and (PA9T+ carbon fiber).

The entire cage 3 is integrally formed by injection molding using a mold axially divided into two mold parts.

As illustrated in FIGS. 1 and 3, the pockets 3a are recessed surfaces defining spaces for receiving the balls 4, and are open to the side surface of the cage 3 on its one axial side The pockets 3a are disposed at regular pitches in the circumferential direction. The balls 4 are received into the pockets 3a through openings of the cage 3 in its left side surface, as in general crown-shaped cages.

In the shown example, the pockets 3a are, as illustrated in FIGS. 1, 3 and 4, open to both of the outer and inner peripheries of the cage 3, and a portion of each pocket 3a capable of abutting against the ball 4 comprises a concave spherical surface extending along the ball 4. In other words, the balls 4 are opposed to the respective pockets 3a in both of the two opposite circumferential directions of the cage, the other axial direction thereof, and the radially outward and inward directions thereof.

Pocket gaps are defined between the pockets 3a and the respective balls 4 so that the cage 3 is freely movable relative to the balls 4 within the range of the pocket gaps. If the cage 3 deforms due to a centrifugal force, and, as a result, some pocket gaps become negative, the corresponding pockets 3a interfere with the balls 4, and they come into contact with each other extremely strongly. If the pocket gaps are increased, such interference is less likely to occur, but acoustic properties deteriorate. In particular, while the ball bearing B is rotating at a high speed, each ball 4 abuts against the pocket 3a due to decrease and increase in its moving speed relative to the cage when entering and exiting the load receiving area of the ball bearing B. Due to this abutment, the circumferential positions of the balls 4 are maintained, but, if the pocket gaps are too large, collision sounds generated at the time of the above abutment become a problem. In order to keep acoustic properties during high-speed rotation at a practical level, the pocket gaps are preferably set at 0.2 mm or less.

In FIG. 1, "H" refers to the axial depth of each pocket 3a, and "d" refers to the diameter of each ball 4 (ball diameter). The depth H corresponds to the distance between the imaginary radial plane in contact with the distal end of the pocket 3a and the imaginary radial plane in contact with the bottom of the pocket 3a. The imaginary radial planes are planes orthogonal to the rotation center axis of the cage 3. The distal end of the pocket 3a is the portion of the pocket 3a located at the extreme one axial end of the pocket 3a. The bottom of the pocket 3a is the portion of the pocket 3a located at the extreme other axial end of the pocket 3a. The depth H coincides with the axial lengths of the protruding portions of the cage 3 protruding in the one axial direction so as to define the pockets 3a.

The cage has to be designed such that each ball 4 will not come out of, i.e., separate from the pocket 3a when, during high-speed rotation of the ball bearing B, the ball 4 circumferentially abuts against the pocket 3a due to increase and decrease in its moving speed relative to the cage. For this purpose, the relationship between the depth H and the diameter d is set at $0.15d \leq H$.

On the other hand, the smaller the depths H of the respective pockets 3, the smaller the radial and circumferential dimensions of the pockets 3a can be made, and also, the less likely the cage is to be affected by a centrifugal force. Another advantage of decreasing the depths H of the pockets 3, and decreasing the radial length of the ring portion of the cage 3 accordingly, is that it is possible to reduce the areas of the portions of the pockets 3a opposed to the balls 4, and thus to reduce the shear resistance of lubricating oil between the balls 4 and the pockets 3a. In other words, the smaller the H/d ratio, the smaller the areas of the portions of the pockets 3a opposed to the balls 4, so that the shear resistance of lubricating oil between the balls 4 and the pockets 3a is reduced, and thus the rotation torque of the cage 3 is reduced. Also, by reducing the shear resistance, the amount of heat generated near the cage 3 is also reduced. Therefore, such a cage is suitable for use in high-speed rotation as in the embodiment of the present invention.

By setting the H/d ratio at various values, separation of the balls from the pockets and deformation of the cage due to a centrifugal force were evaluated. The evaluation results are shown in Table 1 by symbols.

TABLE 1

| H/d | Ball separation from poeckets | Influence of centrifugl force | Shear resistance | Overall evaluation |
| --- | --- | --- | --- | --- |
| 0.1 | X | ⊚ | ⊚ | X |
| 0.15 | ○ | ⊚ | ⊚ | ○ |
| 0.3 | ○ | ⊚ | ⊚ | ○ |
| 0.4 | ○ | ⊚ | ⊚ | ○ |
| 0.45 | ○ | ⊚ | ⊚ | ○ |
| 0.5 | ⊚ | ⊚ | ○ | ○ |
| 0.55 | ⊚ | ○ | ○ | ○ |
| 0.6 | ⊚ | ○ | ○ | ○ |
| 0.65 | ⊚ | ○ | ○ | ○ |
| 0.7 | ⊚ | Δ | X | X |
| 0.75 | ⊚ | Δ | X | X |

In Table 1, the item "ball separation from pockets" shows how well ball separation from the pockets was prevented; the item "influence of centrifugal force" shows how well deformation of the pockets due to a centrifugal force decreased; the item "shear resistance" shows evaluation results on the shear resistance of lubricating oil between the balls and the pockets; and the item "overall evaluation" shows evaluation results on suitability for high-speed operation of the ball bearings tested. In these items, the symbol "⊚" means extremely good, the symbol "○" means good, and the symbol "X" means bad.

As shown in Table 1, if the depths H of the pockets are set at H>0.65d, as with conventional crown-shaped cages, the pockets can be shaped such that the movement of the cage in the other axial direction is restricted only by the engagement of the pockets and the balls, However, if the cage is made of an engineering plastic (or plastics), this particularly increases the risk that the pockets may interfere with the balls during high-speed rotation exceeding 2 million dmn.

By setting the depths H at H≤0.65d, it is possible to shorten the axial lengths of the protruding portions of the cage 3 protruding to define the pockets 3a, and thus reduce their weight, thereby reducing the influence of the centrifugal force on the cage 3.

In the cage 3 shown, the depths H are set at H<0.5d, more specifically, H=0.45d.

By setting the depths H at H≤0.5d, the pockets 3a do not become undercuts during the above-described injection molding step, and thus the shapes of the pockets 3a are not distorted during release from the mold. This provides improved dimensional accuracy of the pockets 3a.

If the depth H of each pocket 3a is set at H<0.5d, the width of the opening of the pocket 3a in the left side surface of the cage 3 needs to be smaller than the diameter d of the ball 4, which means that the pocket 3a cannot engage with the ball 4 in the other axial direction. Even if the depth H is set at 0.5d<H≤0.65d so as to shape the pocket 3a such that the pocket 3a can abut against the ball 4 in the right direction, such abutment is shallow, and there is a concern that, while the ball bearing B is rotating at a high speed, only such shallow abutment may not be sufficient to restrict the movement of the cage 3 in the other axial direction. Especially if the depth H is H<0.5d, the direction in which the ball 4 abuts against the pocket 3a approaches the other axial direction, thus increasing the component force with which the ball 4 pushes the pocket 3a in the other axial direction.

In the present invention, by using the below-described structure, which enables the cage 3 to engage, in the other axial direction, with at least one of the outer and inner bearing rings 1 and 2 so as to restrict, utilizing such engagement, the movement of the cage 3 in the other axial direction, the relationship between the depth H and the ball diameter d can be set at H≤0.65d.

Specifically, the outer bearing ring 1 includes an engaging portion 1b for restricting the movement of the cage 3 in the other axial direction; and a groove 1c defining the engaging portion 1b.

The groove 1c is formed on the portion of the inner periphery of the outer bearing ring 1 on the other axial side of the raceway surface 1a; has a depth in the radial direction; and extends continuously around the entire circumference. The groove 1c has a constant sectional shape over the entire circumference.

The engaging portion 1b constitutes the portion of the inner periphery of the outer bearing ring 1 from the bottom of the groove 1c to the other axial end of the outer bearing ring.

Figure 5:
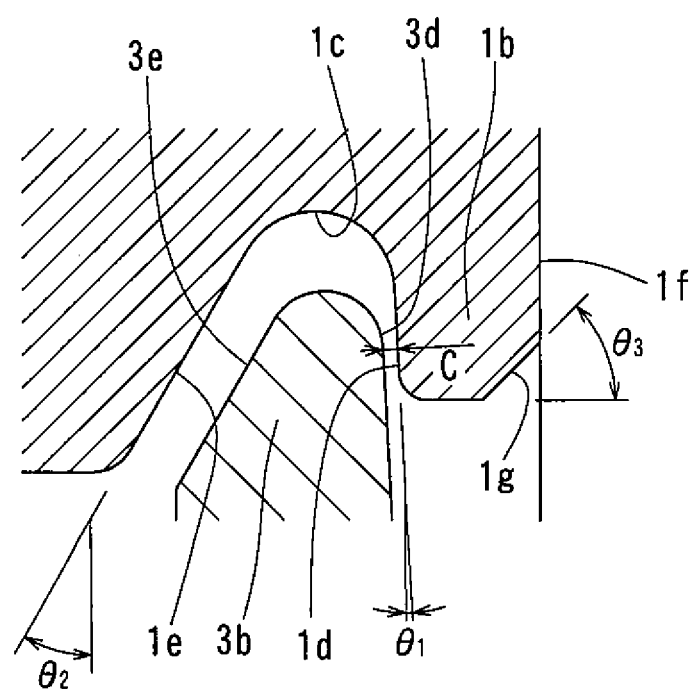
FIG. 5 is a partially enlarged sectional view of the engagement portions of the cage illustrated in FIG. 1.

As illustrated in FIG. 5, the engaging portion 1b has a receiving surface 1d inclined at an inclination angle θ1 of 10 degrees or less relative to the other axial direction, in the radially inward direction (i.e., toward the distal end of the engaging portion 1b). The distal end of the engaging portion 1b is the radially highest portion of the engaging portion 1b. The engaging portion 1b has a circular arc-shaped cross section at its portion from the distal end of the engaging portion 1b to the receiving surface 1d, and has a circular arc-shaped cross section at its portion from the receiving surface 1d to the bottom of the groove 1c.

The groove 1c has an inclined surface 1e at its portion axially opposed to the receiving surface 1d. The portion of the groove 1c from the groove bottom to the inclined surface 1e defines a surface having a circular arc-shaped cross section identical to that of the portion of the engaging portion 1b from the receiving surface 1d to the bottom of the groove 1c. The inclined surface 1e is connected to a shoulder defining the inner diameter of the outer bearing ring 1. The inclined surface 1e is inclined at an inclination angle θ2 relative to the one axial direction, in the radially inwardly direction (i.e., in the direction away from the groove bottom). The inclination angle θ2 is larger than the inclination angle θ1. Because the inclined surface 1e has a large inclination angle, when forming the groove 1c by grinding with a rotary grinder, chips are easily discharged along the inclined surface 1e.

The engaging portion 1b also has a chamfer 1g connecting together the distal end of the engaging portion 1b and a width surface 1f of the outer bearing ring 1 at the other axial end thereof. "Width surfaces" refer to the surfaces of a component located at both axial ends thereof, and defining the axial length (total length) of the component. The width surface 1f of the outer bearing ring 1 is one of two radially extending side surfaces defining the width of the outer bearing ring.

The chamfer 1g has an inner diameter which gradually increases from the distal end of the engaging portion 1b toward the other axial end of the bearing (so that the difference in diameter between the distal end and the chamfer 1g gradually increases in the other axial direction). The chamfer 1g has a length of 0.2 mm or more from the distal end of the engaging portion 1b toward the other axial end, and is inclined, at an inclination angle θ3 of 45 degrees or more relative to the other axial direction, in the radially outward direction.

As illustrated in FIG. 1, the cage 3 includes engagement portions 3b disposed on the other axial side of the pockets 3a so as to be engageable with the engaging portion 1b in the other axial direction.

As illustrated in FIGS. 1 and 3, the outer periphery and the inner periphery of the cage 3 each includes a cylindrical surface formed on the other axial side of the pockets 3a. The cylindrical surface on the inner periphery of the cage 3 has an axial width larger than that of the cylindrical surface on the outer periphery of the cage 3.

As illustrated in FIGS. 1 and 4, the engagement portions 3b are located at the other axial end of the outer periphery of the cage 3, and each has a height in the radial direction from the cylindrical surface of the outer periphery of the cage 3.

As illustrated in FIG. 3, the engagement portions 3b are circular arc-shaped protruding pieces extending in the circumferential direction. The cage 3 includes two or more such engagement portions 3b. The engagement portions 3b are spaced apart from each other at equal intervals in the circumferential direction. The position of the circumferential center of each engagement portion 3b coincides with the position of the circumferential center of the corresponding pocket 3a, and the engagement portion 3b has a circumferential length larger than that of the pocket 3a. The spaces between the respective circumferentially adjacent pairs of engagement portions 3b are open at both axial ends thereof.

The cage 3 has small wall thicknesses at its portions where the bottoms of the pockets 3a are present, and thus is weak in strength at these portions. However, since the engagement portions 3b are each disposed within an angle range around the rotation center axis of the cage 3 which includes or covers the angle range around the rotation center axis thereof within which the corresponding pocket 3a is present, any loads applied to the bottoms of the pockets 3a can be alleviated by the respective engagement portions 3b.

As illustrated in FIGS. 3 and 4, the portion of the side surface, on the one axial side, of the cage 3 between the distal ends of each circumferentially adjacent pair of pockets 3a is a circular arc-shaped width surface 3c continuously extending in the circumferential direction. The portion of the outer periphery of the cage 3 between each circumferentially adjacent pair of pockets 3a is a circular arc-shaped surface equal in diameter to the cylindrical surface on the outer periphery of the cage 3. The portion of the inner periphery of the cage 3 between each circumferentially adjacent pair of pockets 3a comprises a circular arc-shaped surface equal in diameter to the cylindrical surface on the inner periphery of the cage 3.

As illustrated in FIGS. 1 and 5, the engagement portions 3b are opposed to the receiving surface 1d of the engaging portion 1b in the other axial direction. The portion of the right side surface of each engagement portion 3b opposed to the receiving surface 1d in the other axial direction is an opposed end surface portion 3d extending along and opposed to the receiving surface 1d.

Each engagement portion 3b is shaped such that its diameter gradually decreases from the distal end of the engagement portion 3b in the one axial direction (i.e., such that the difference in its diameter from its distal end gradually increases in the one axial direction). The distal end of the engagement portion 3b is the radially highest portion of the engagement portion 3b. The portion of the surface of the engagement portion 3b opposed to the inclined surface 1e in the one axial direction is an inclined surface 3e along the inclined surface 1e. The engagement portion 3b has a circular arc-shaped cross section at its portion extending from the inclined surface 3e to the opposed end surface portion 3d via the distal end.

The step of mounting the cage 3 between the outer and inner bearing rings 1 and 2 such that the balls 4 are received in the respective pockets 3a of the cage 3 is the same as the step of mounting conventional crown-shaped cages. During this mounting step, the engagement portions 3b are pushed, in the one axial direction, against the engaging portion 1b, from the other axial side of the engaging portion 1b. As a result, the cage 3, including the engagement portions 3b, is elastically deformed, and thus the engagement portions 3b are forcibly moved over the engaging portion 1b into the groove 1c. In this state, the engagement portions 3b are engageable with the engaging portion 1b in the right (the other axial) direction.

During this mounting step, since the engagement portions 3b are spaced apart from each other in the circumferential direction, the engagement portions 3b are elastically deformable easily so as to be freed from the engaging portion 1b.

When the engagement portions 3b are pushed against the chamfer 1g of the engaging portion 1b, due to the inclination angle θ3 of the chamfer 1g, the engagement portions 3b are easily slid on the chamfer 1g, and easily pushed strongly in the other axial direction and inwardly obliquely. This easily generates deformation of the cage 3 (deflection of the engagement portions 3b or torsional deformation of the cage 3) to make the engagement portions 3b freed from the engaging portion 1b such that the distal ends of the engagement portions 3b reach the distal end of the engaging portion 1b. The chamfer 1g may have a rounded shape with or without a radius of curvature.

Also, when the engagement portions 3b are pressed against the engaging portion 1b, since the engagement portions 3b have a gradually decreasing diameter as described above, the engagement potions 3b are easily slid on the engaging portion 1b, and also easily pushed strongly in the above oblique direction. This easily generates deformation of the cage 3 to make the engagement portions 3b freed from the engaging portion 1b such that the distal ends of the engagement portions 3b reach the distal end of the engaging portion 1b.

Axial and radial clearances are defined between the engagement portions 3b and the entire groove 1c including the engaging portion 1b. These clearances are shown exaggeratedly.

Due to the radial clearance between the groove 1c and the engagement portions 3b, lubricating oil can be supplied between the engaging portion 1b and the engagement portions 3b from outside the bearing, and lubricating oil inside the bearing can be supplied therebetween, too. Also, due to the spaces between the respective circumferentially adjacent pairs of engagement portions 3b, lubricating oil inside the bearing can be easily delivered between the engaging portion 1b and the engagement portions 3b. Also, while the ball bearing is rotating at a high speed, pumping action is produced based on the difference in peripheral speed at the inclined surface 1e of the groove 1c, so that lubricating oil is rotated together with the inclined surface 1e and easily moves toward the engaging portion 1b.

The axial clearance C between the engaging portion 1b and the engagement portions 3b is defined between the receiving surface 1d of the engaging portion 1b and the opposed end surface portions 3d of the engagement portions 3b.

While the ball bearing is rotating at a high speed, the balls 4 abut against the pockets 3a, and thus the component forces in the other axial direction are applied to the cage 3. When the cage 3 tends to move in the other axial direction by more than the clearance C, the engagement portions 3b engage with the engaging portion 1b in the other axial direction, thereby preventing the engagement portions 3b from further moving in the other axial direction. Therefore, the cage 3 never moves out of the bearing in the other axial direction.

The above engagement is the engagement between the opposed end surface portions 3d of the engagement portions 3b and the receiving surface 1d of the engaging portion 1b. Since the receiving surface 1d is inclined at an inclination angle 82 of 10 degrees or less from left to right and radially inwardly, large radially inward component forces are not generated. Therefore, the cage 3 never deforms to make the engagement portions 3b freed from the engaging portion 1b such that the distal ends of the engagement portions 3b reach the distal end of the engaging portion 1b.

The clearance C is set to be sufficiently larger than 1.5 μm so that, while the ball bearing is rotating at a high speed, oil films having a thickness of at least 1.5 μm can be formed between the receiving surface 1d and the respective opposed end surface portions 3d.

Also, the clearance C is set within a numerical range in which, with the engagement portions 3b and the engaging portion 1b engaged with each other, the pockets 3a can maintain the circumferential positions of the balls 4.

The cage 3 may be a rolling element-guided type or a bearing ring-guided type. If clearances larger than the pocket gaps are set between the entire cage 3 and the entire outer bearing ring 1 and between the entire cage 3 and the entire inner bearing ring 2, the cage 3 is the rolling element-guided type, i.e., radially guided by the balls 4. If the cage 3 is such a rolling element-guided type, gaps are ensured between the engagement portions 3b and the bearing ring 1 (bearing ring including the engaging portion 1b), thus preventing contact of the engagement portions 3b with the bearing ring 1, and thereby preventing the engagement portions 3 from becoming worn such that their heights decrease.

If the pocket gaps are set to be larger than the clearance between the engagement portions 3b and the groove 1c (including the engaging portion 1b), even if the cage 3 deforms due to a centrifugal force, the pockets 3a are less likely to hold (i.e., interfere with) the balls 4. Because such a cage is the bearing ring-guided type, i.e., guided by the bearing ring using the engagement portions 3b, this cage is suitable for use in a case where the wear of the engagement portions 3b due to the rotation thereof relative to the groove 1c can be substantially prevented due to fluid lubrication.

The surfaces of each engagement portion 3b and the groove 1c, including the engaging portion 1b, have surface portions circumferentially slidable relative to each other. In order to realize the above-mentioned fluid lubrication, each of these circumferentially slidable surface portions preferably has an arithmetic mean roughness Ra of 0.2 μm or less. The "arithmetic mean roughness Ra" is defined in JIS B0601:2001 "Geometric property specifications (GPS) of product—surface properties: Contour curve method—term, definition and surface properties parameter".

It can be considered that the surface properties of each engagement portion 3b and the groove 1c follow a normal distribution. Therefore, it is considered that the root mean square roughness σ1 of the surface of the engagement portion 3b, including the opposed end surface portion 3d, and the root mean square roughness σ2 of the groove 1c, including the receiving surface 1d, are each 1.25 Ra. An oil film parameter A obtained by hmin/√(σ1²+σ2²), where hmin is the minimum oil film thickness between the opposed end surface portion 3d and the receiving surface 1d, is Λ>3 if hmin is 1.5 μm or more. If the oil film parameter A is Λ>3, it is considered that the friction condition between the opposed end surface portions 3d and the receiving surface 1d becomes substantially fluid lubrication condition.

If the ball bearing B is used to support a rotary shaft of an electric motor of, e.g., an electric vehicle (EV), after the electric motor starts to rotate, the ball bearing B quickly reaches a rotation speed (which is the difference in peripheral speed between the cage 3 and the bearing ring 1 due to their relative rotation) at which the minimum oil film thickness hmin becomes 1.5 μm or more. Therefore, the friction condition between each of the engagement portions 3b and the groove 1c is maintained in fluid lubrication condition during most of the operation time.

In the above-described ball bearing B of the first embodiment, since the movement of the cage 3 (shown in FIGS. 1 and 5) in the other axial direction can be restricted due to the engagement of the engagement portions 3b of the cage 3 and the engaging portion 1b of the bearing ring 1, the relationship between the axial depth H of each pocket 3a, which is open to the side surface of the cage 3 on its one axial side, and the diameter d of the corresponding ball 4 can be set at H≤0.65d.

Also, in the ball bearing B of the first embodiment, because (i) the engaging portion 1b is disposed on the other axial side of the raceway surface 1a of the bearing ring 1, and (ii) the corresponding engagement portions 3b are disposed on the other axial side of the pockets 3a of the cage 3, the engagement portions 3b are not present at the protruding portions of the cage 3 defining the pockets 3a. Therefore, while the ball bearing B is rotating at a high speed, the centrifugal force applied to the engagement portions 3b is less likely to cause the pockets 3a to come into abnormal contact with the balls 4.

Also, in the ball bearing B of the first embodiment, since the depths H of the pockets 3a are set at H≤0.65d, it is possible to shorten the above protruding portions of the cage 3, and thus reduce their weight. As a result, it is possible to reduce deformation of the cage 3 due to a centrifugal force, and also to reduce the shear resistance of lubricating oil between the balls 4 and the pockets 3a.

Also, in the ball bearing B of the first embodiment, if the relationship between the depth H of each pocket 3a and the diameter d of the ball 4 is set at H<0.5d, it is possible to further reduce deformation of the cage 3 due to a centrifugal force, and the above-mentioned shear resistance, and also to improve the dimensional accuracy of the pockets 3a if the cage is formed by injection molding.

Also, in the ball bearing B of the first embodiment, because (i) an axial clearance C is set between the engaging portion 1b and the engagement portions 3b, and ii) an Ra of 0.2 μm or less is set for the opposed end surface portions 3d of the engagement portions 3b and the receiving surface 1d, i.e., the above-described circumferentially slidable surface portions of the engagement portions 3b and the engaging portion 1b, an oil film is formed between each opposed end surface portion 3d and the receiving surface 1d, and, when the minimum oil film thickness hmin becomes 1.5 μm or more, the friction condition of the oil film parameter Λ>3 (substantially fluid lubricant condition) is expected. Therefore, it is possible to prevent wear of the engaging portion 1b and the engagement portion 3b.

Also, in the ball bearing B of the first embodiment, since the cage 3 includes two or more engagement portions 3b disposed at two or more circumferentially spaced apart locations (see FIG. 3, too), when mounting the cage 3 between the outer and inner bearing rings 1 and 2, the engagement portions 3b can be easily freed from the engaging portion 1b, and thus can be forcibly moved over the engaging portion 1b with ease.

While a single engagement portion 3b continuously extending around the entire circumference of the cage may be used, a stronger force would be required to move such a single engagement portion 3b over the engaging portion 1b for force fitting. Therefore, circumferentially spaced apart engagement portions 3b are preferably used.

Also, in the ball bearing B of the first embodiment, since the engaging portion 1b has a chamfer 1g shaped such that the difference in diameter between the distal end of the engaging portion 1b and the chamfer 1g gradually increases in the other axial direction, when mounting the cage 3 between the outer and inner bearing rings 1 and 2, the engagement portions 3b can be easily freed from the engaging portion 1b while sliding on the engaging portion 1b, and thus can be forcibly moved over the engaging portion 1b with ease.

Also, in the ball bearing B of the first embodiment, since the engagement portions 3b are each shaped such that the difference in its diameter from its distal end gradually increases in the one axial direction, when mounting the cage 3 between the outer and inner bearing rings 1 and 2, the engagement portions 3b can be easily freed from the engaging portion 1b while sliding on the engaging portion 1b, and thus can be forcibly moved over the engaging portion 1b with ease.

Also, in the ball bearing B of the first embodiment, because (i) the engagement portion 1 has a receiving surface 1d inclined at an inclination angle θ1 of 10 degrees or less relative to the other axial direction, in the radial direction toward the distal end of the engaging portion 1b, and (ii) the engagement portions 3b are disposed so as to be engageable with the receiving surface 1d in the other axial direction, when the engagement portions 3b engage with the engaging portion 1b in the other axial direction, the engagement portions 3b cannot be easily freed from the engaging portion 1b, thus making it possible to prevent separation of the cage Sin the other axial direction.

Also, in the ball bearing B of the first embodiment, because (i) the bearing ring 1 has, at a position of the inner periphery of the bearing ring 1 on the other axial side of the raceway surface 1a, a groove 1c having a depth in the radial direction, and extending continuously around the entire circumference of the bearing ring 1, and (ii) the engaging portion 1b constitutes the portion of the inner periphery of the bearing ring 1 from the other axial end of the bearing ring 1 to the bottom of the groove 1c, it is possible to use a seal-attaching groove of a general outer bearing ring as the groove 1c of the present invention, and to use the portion of this outer bearing ring on the other side of the seal-attaching groove as the engaging portion 1b of the present invention, so that the axial layout of a general ball bearing can be used.

Also, in the ball bearing B of the first embodiment, since the cage 3 is formed of an engineering plastic, it is possible to reduce the cost for manufacturing the cage by avoiding the use of an expensive super engineering plastic.

The ball bearing B includes a single cage 3 in the first embodiment, but may include two cages, in which case the two cages are disposed on both sides of the balls. When placing the balls in the pockets of the two cages, the pockets of the cages preferably have depths H smaller than 0.5d so that the cages on both sides of the balls do not abut against each other in the axial direction Since the bearing ring 1 additionally includes, on the one axial side thereof, elements corresponding to the engaging portion 1b and the groove 1c, the cage can be disposed on the opposite side, i.e., the one axial side of the bearing ring 1.

Figure 6:
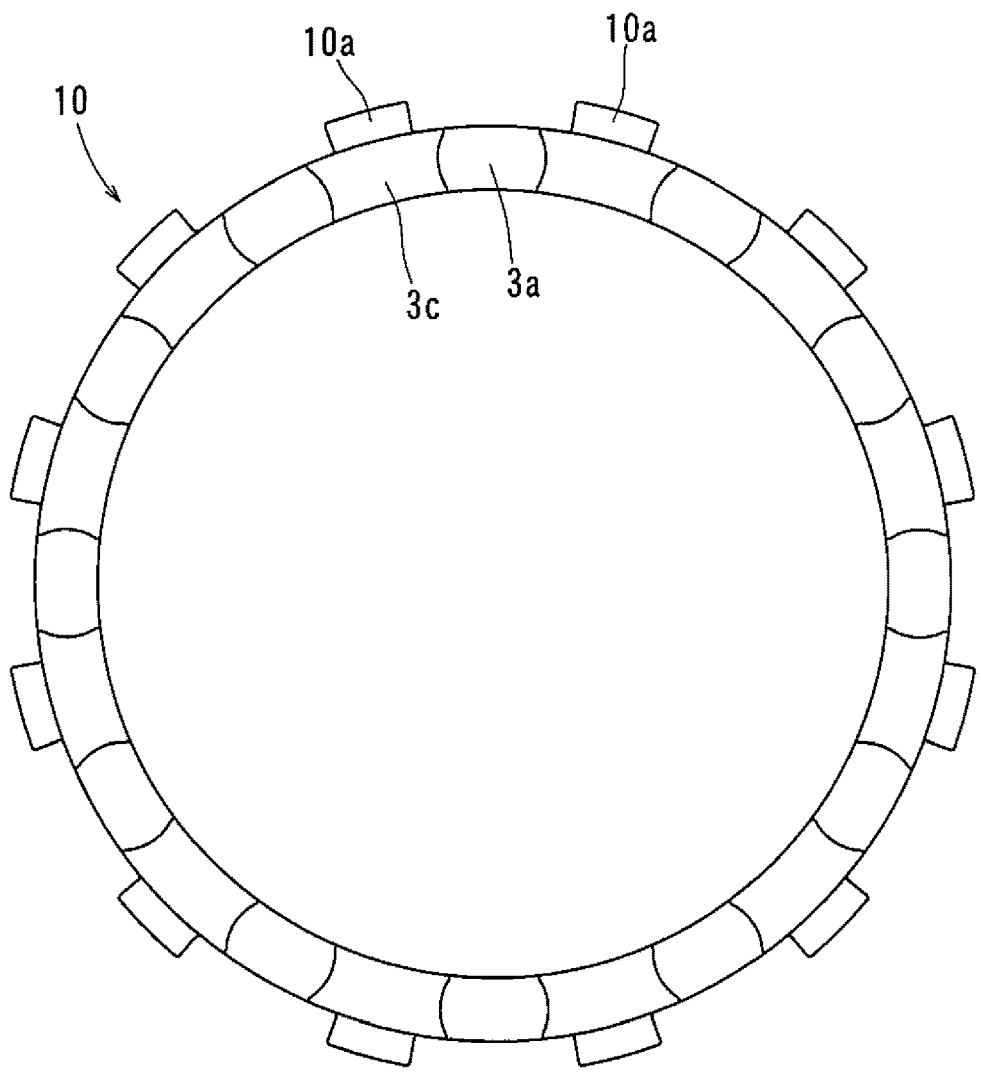
FIG. 6 is a left side view of a cage according to a second embodiment of the present invention.
Figure 7:
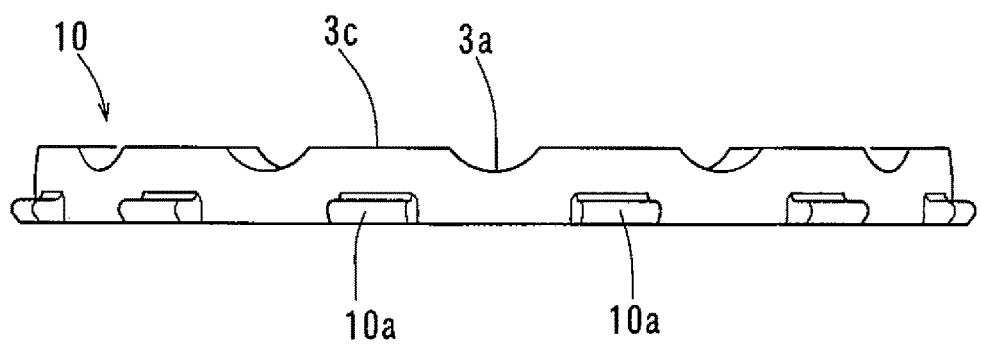
FIG. 7 is a plan view of the cage illustrated in FIG. 6.

In the first embodiment, in order to prioritize restricting the movement of the cage 3, as is apparent from FIG. 3, the circumferential lengths of the respective engagement portions 3b are larger than the circumferential lengths of the spaces between the (respective circumferentially adjacent pairs of) engagement portions 3b, and the total circumferential length of all the spaces between the engagement portions 3b is smaller than the total circumferential length of all the engagement portions 3b. However, the engagement portions 3b may be arranged to be spaced apart from each other in a different manner. The second embodiment shown in FIGS. 6 and 7 is such an example. Only the features of the second embodiment different from those of the first embodiment are described below (see FIG. 1 for the bearing rings and the balls, if necessary).

With the cage 10 of the second embodiment, the engagement portions 10a have circumferential lengths smaller than the circumferential lengths of the spaces between the respective circumferentially adjacent pairs of engagement portions 10a, and the total circumferential length of all the engagement portions 10a is smaller than the total circumferential length of all the spaces between the engagement portions 10a. Therefore, in the second embodiment, when mounting the cage 10, the engagement portions 10a easily deform so as to be freed from the engaging portion 1b. Also, lubricating oil can be easily supplied between the engagement portions 10a and the engaging portion 1b.

Each engagement portion 10a is disposed out of the angle ranges within which the pockets 3a are present. Such arrangement is suitable when the lubricating performance near the balls 4 is important.

Figure 8:
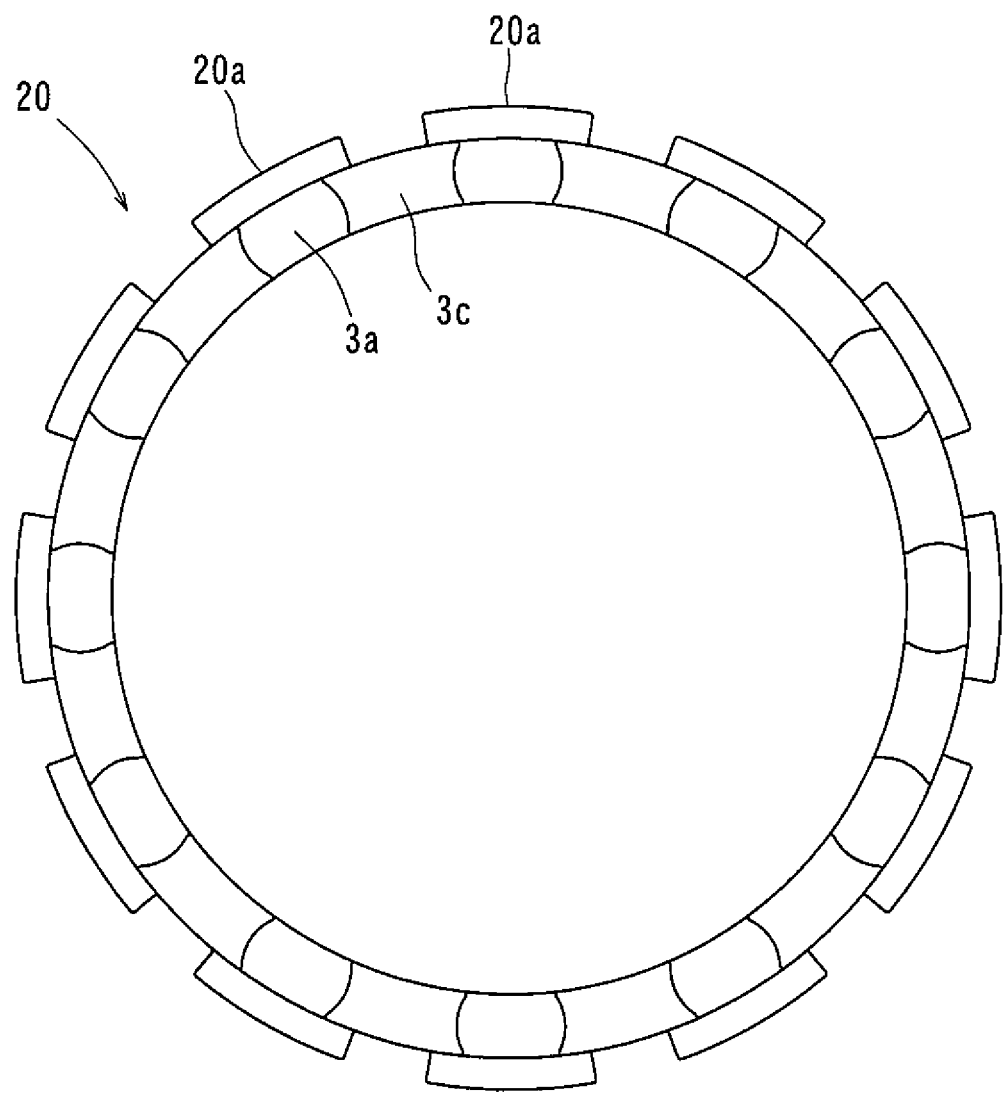
FIG. 8 is a left side view of a cage according to a third embodiment of the present invention.

The third embodiment as another example is shown in FIG. 8. Each engagement portion 20a of the cage 20 of the third embodiment is disposed in the angle range within which the corresponding pocket 3a is present, and has a circumferential length smaller than in the first embodiment so that the cage 20 can be easily mounted.

Figure 9:
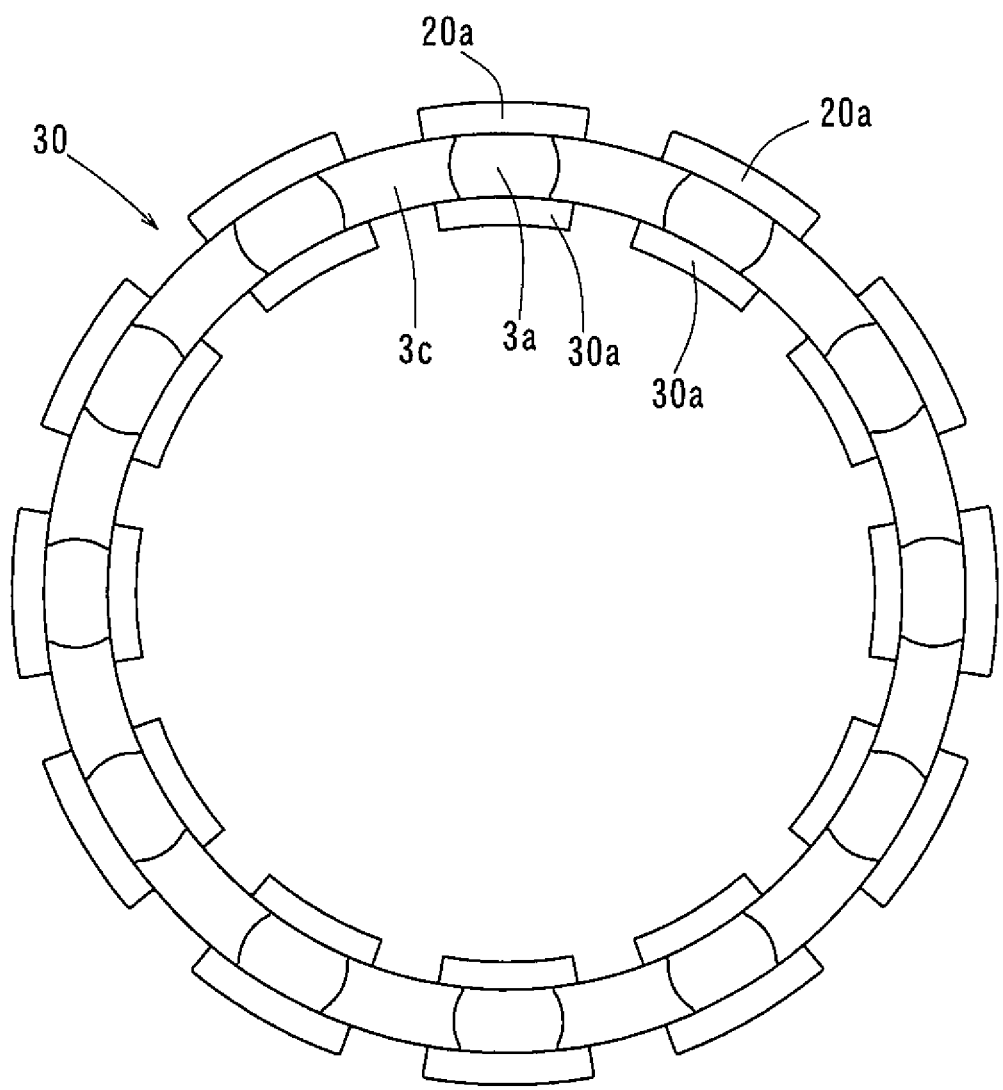
FIG. 9 is a left side view of a cage according to a fourth embodiment of the present invention.
Figure 10:
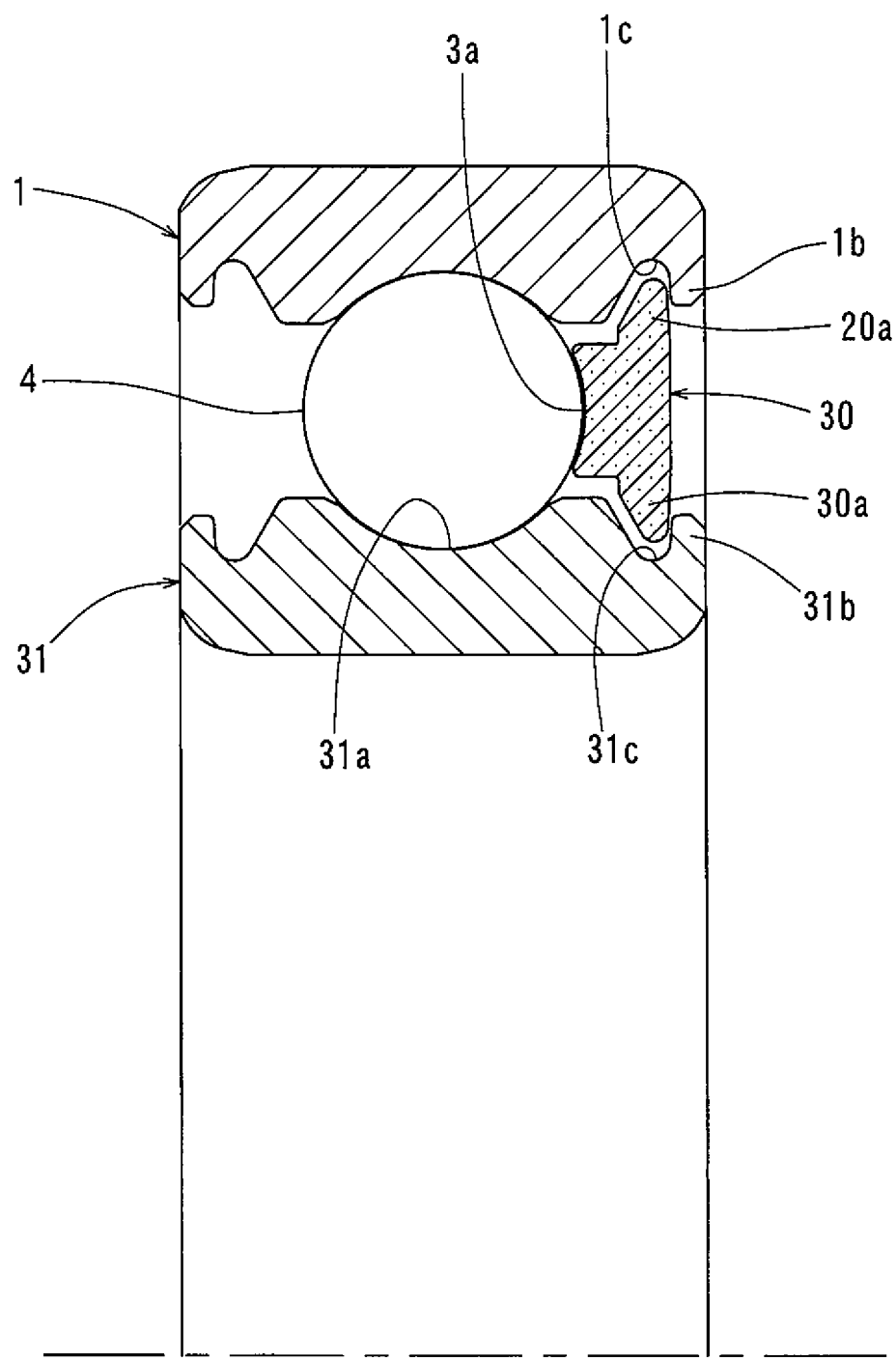
FIG. 10 is a sectional view of a ball bearing according to the fourth embodiment of the present invention.

While the engagement portions are disposed only on the outer periphery of the cage in each of the above first to third embodiments, the engagement portions may be disposed on both of the inner and outer peripheries of the cage. The fourth embodiment shown in FIGS. 9 and 10 is such an example.

In particular, the cage 30 of the fourth embodiment includes, in addition to the engagement portions 20a on the outer periphery thereof, engagement portions 30a on the inner periphery thereof. The inner engagement portions 30a are also each disposed in the angle range within which the corresponding pocket 3a is present.

The inner bearing ring 31 includes an inner raceway surface 31a, an inner engaging portion 31b, and an inner groove 31c forming the inner engaging portion 31b. Since the inner engagement portions 30a, engaging portion 31b, and groove 31c are simply mirror images, in the radial direction, of the outer engagement portions 20a, the outer engaging portion 1b, and the outer groove 1c, respectively, their detailed description is omitted.

In the ball bearing of the fourth embodiment, because (i) the outer bearing ring 1 and the inner bearing ring 31 include the engaging portions 1b and 31b, respectively, and (ii) the cage 30 includes outer engagement portions 20a corresponding to the engaging portion 1b of the outer bearing ring 1, and inner engagement portions 30a corresponding to the engaging portion 31b of the inner bearing ring 31, it is possible to restrict the movement of the cage 30 in the other axial direction by both the engagement of the outer engagement portions 20a of the cage 30 and the engaging portion 1b of the outer bearing ring 1, and the engagement of the inner engagement portions 30a of the cage 30 and the engaging portion 31b of the inner bearing ring 31. Therefore, it is possible to more reliably prevent the cage 30 from moving out of the bearing in the other axial direction.

Figure 11:
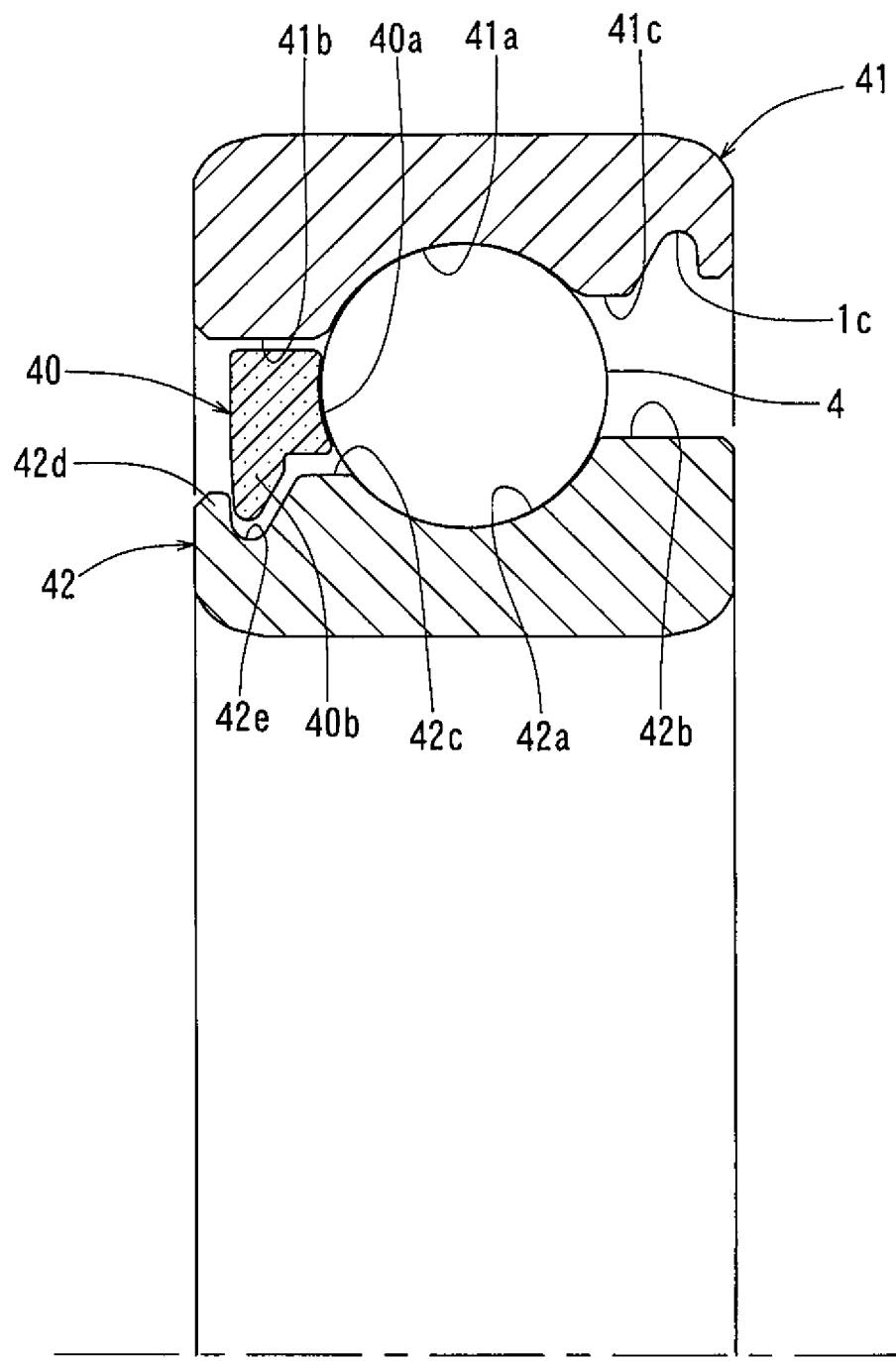
FIG. 11 is a sectional view of a ball bearing according to a fifth embodiment of the present invention.

While, in each of the above first to fourth embodiments, the ball bearing includes bearing rings for a standard deep groove ball bearing, i.e., bearing rings including, on both sides of the raceway surface, shoulders having the same height, bearing rings may be used including, on both sides of the raceway surface, shoulders different in height from each other. Also, the engagement portions may be disposed only on the inner periphery of the cage. The fifth embodiment shown in FIG. 11 is such an example.

The outer bearing ring 41 of the fifth embodiment includes first and second outer shoulders 41b and 41c formed on both sides of the outer raceway surface 41a such that the first outer shoulder 41b is higher than the second outer shoulder 41c.

The inner bearing ring 42 includes first and second inner shoulders 42b and 42c formed on both sides of the inner raceway surface 42a such that the first inner shoulder 42b is higher than the second inner shoulder 41c.

The first outer shoulder 41b and the second inner shoulder 42c are radially opposed to each other. The second outer shoulder 41c and the first inner shoulder 42b are radially opposed to each other.

With the ball bearing of the fifth embodiment, compared to the ball bearing of the first embodiment, it is possible to improve its capacity for receiving thrust loads applied in the directions in which the balls 4 come into contact with the first outer shoulder 41b and the first inner shoulder 42b. The second outer shoulder 41c and the second inner shoulder 42c are similar or equal in height to the shoulders of the first embodiment.

The cage 40 is disposed between the first outer shoulder 41b and the second inner shoulder 42c Thus, in FIG. 11, the one axial side of the cage 40 is located on the right side, and the other axial side of the cage 40 is located on the left side.

The pockets 40a have radial lengths shorter than in the first embodiment. This is because, as a result of increasing the height of the first outer shoulder 41b compared to the first embodiment, the radial distance between the first outer shoulder 41b and the second inner shoulder 42c is reduced.

The engagement portions 40b are disposed only on the inner periphery of the cage 40. The inner bearing ring 42 includes the corresponding engaging portion 42d and groove 42e.

If the outer bearing ring 41 is the rotatable ring, since the first outer shoulder 41b has an inner diameter smaller than that of the second outer shoulder 41c, the peripheral speed of the first outer shoulder 41b is slower than that of the second outer shoulder 41c. Since, due to this difference in peripheral speed, the pressure of lubricating oil rotated together with the first outer shoulder 41b becomes relatively high, and the pressure of lubricating oil rotated together with the second outer shoulder 41c becomes relatively low, pumping action is produced to send lubricating oil from the side of the first outer shoulder 41b to the side of the second outer shoulder 41c.

If the inner bearing ring 42 is the rotatable ring, since the second inner shoulder 42c has an outer diameter smaller than that of the first inner shoulder 42b, the peripheral speed of the second inner shoulder 42c is slower than that of the first inner shoulder 42b. Since, due to this difference in peripheral speed, the pressure of lubricating oil rotated together with the second inner shoulder 42c becomes relatively high, and the pressure of lubricating oil rotated together with the first inner shoulder 42b becomes relatively low, pumping action is produced to send lubricating oil from the side of the second inner shoulder 42c to the side of the first inner shoulder 42b.

Therefore, regardless of whether the outer bearing ring 41 is the rotatable ring or the inner bearing ring 42 is the rotatable ring, due to the above pumping action of the rotatable ring, lubricating oil is sent from the space between the first outer shoulder 41b and the second inner shoulder 42c toward the space between the second outer shoulder 41c and the first inner shoulder 42b. Depending on whether the cage is on the upstream side or the downstream side relative to the flow of lubricating oil due to this pumping action, it is possible to adjust the flow of lubricating oil into and out of the bearing.

In the shown example, since the cage 40 is disposed only on the upstream side, lubricating oil cannot easily flow into the bearing (i.e., into the annular space between the outer and inner bearing rings 41 and 42), and can easily flow out of the bearing. Therefore, lubricating oil is less likely to excessively remain in the bearing.

If the cage is disposed only on the downstream side, lubricating oil can easily flow into the bearing from the upstream side, and cannot easily flow out of the bearing. Therefore, it is possible to prevent lubricating oil from excessively flowing out of the bearing.

Depending on the lubrication environment, an additional cage may be used such that the two cages are disposed on the upstream and downstream sides, respectively. In this case, the additional cage is disposed by utilizing the groove 1c of the outer ring 41. By disposing cages on both the upstream and downstream sides, it is possible to reduce both the amount of lubricating oil flowing into the bearing and the amount of lubricating oil flowing out of the bearing. Therefore, this arrangement is particularly suitable when the concentration and viscosity of lubricating oil need to be reduced.

While, in each of the above embodiments, the Ra of e.g., the engagement portions of the cage is set at a value suitable for fluid lubrication, fluid lubrication condition may be realized by actively generating dynamic pressure to promote oil film formation. The sixth embodiment shown in FIGS. 12 to 15 is such an example.

Each engagement portion 50a on the cage 50 of the sixth embodiment includes first protrusions 50b on its side surface on the other axial side, and second protrusions 50c on its side surface on the one axial side.

The first and second protrusions 50b and 50c each has a height in the axial direction, and extends straight in the radial direction. Each engagement portion 50a includes two or more of the first protrusions 50b, and the two or more first protrusions 50b are distributed along the entire circumferential length of the engagement portion 50a so as to be disposed at regular pitches in the circumferential direction. Each engagement portion 50a includes two or more of the second protrusions 50c disposed in the same manner as the first protrusions 50b. The first protrusions 50b and the second protrusions 50c are identical in phase to each other. Each first protrusion 50b and one of the second protrusions 50c are connected together at the distal end of the engagement portion 50a.

Figure 12:
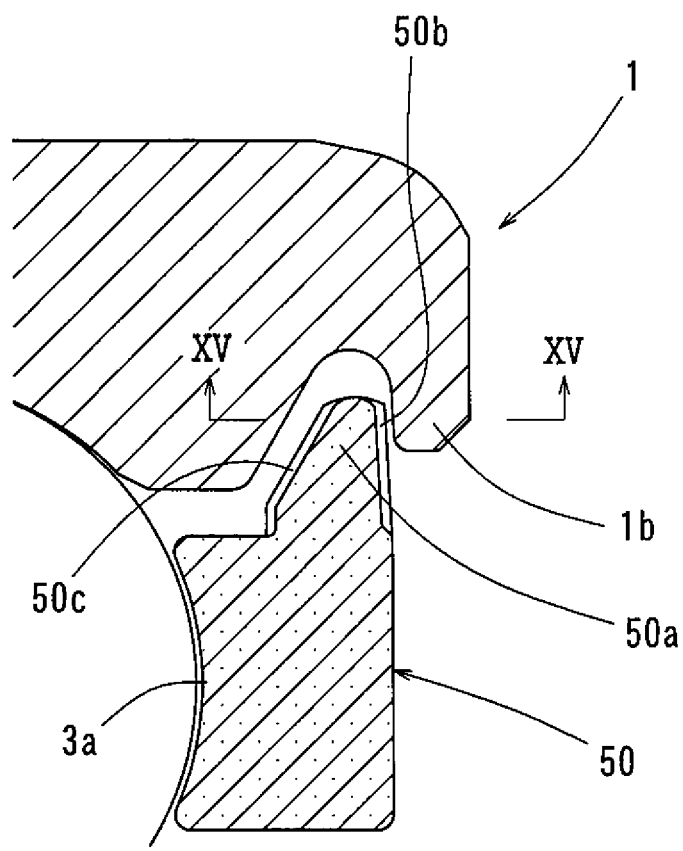
FIG. 12 is a partially enlarged sectional view of the engagement portions of a cage according to a sixth embodiment of the present invention.
Figure 13:
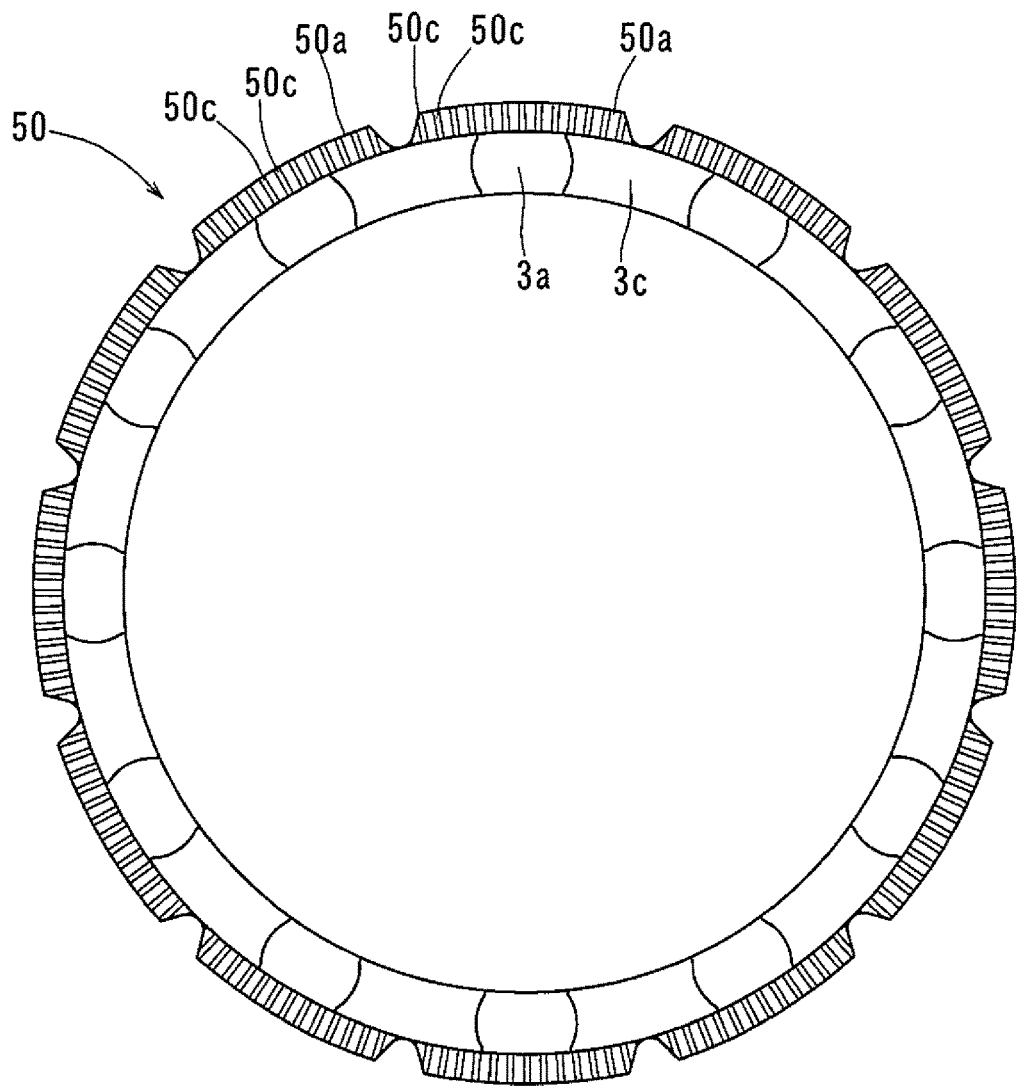
FIG. 13 is a left side view of the cage according to the sixth embodiment.
Figure 14:
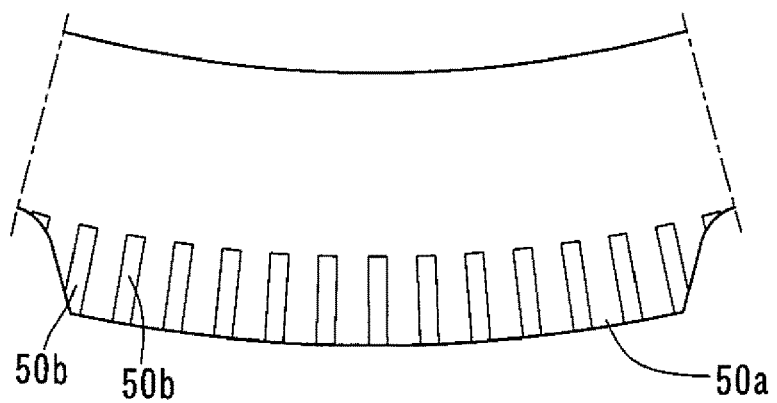
FIG. 14 is a right side view of the engagement portions of the cage according to the sixth embodiment.
Figure 15:
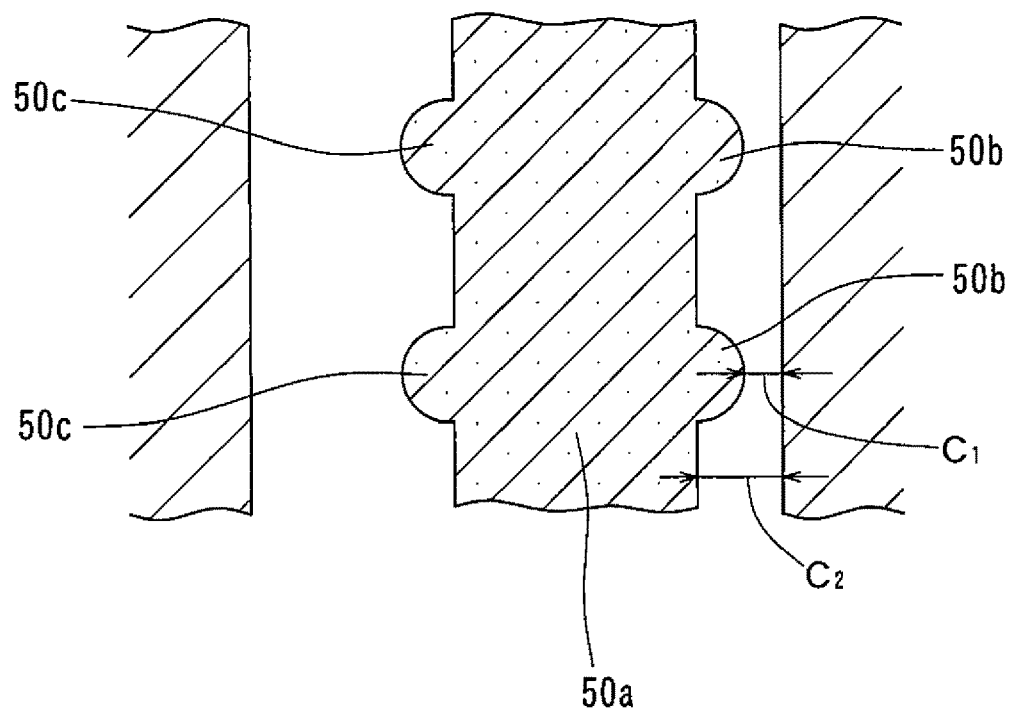
FIG. 15 is a partially enlarged sectional view taken along line XV-XV of FIG. 12.

As illustrated in FIGS. 12 and 15, an axial clearance C1 is defined between the engaging portion 1b and the engagement portions 50a. Each first protrusion 50b defines, between the first protrusion 50b and the engaging portion 1b, spaces which narrow in the circumferential direction by the axial length of (C2−C1).

The portions of the cage between the circumferentially adjacent first protrusions 50b are unable to come into contact with the engaging portion 1b. Lubricating oil flows into the gaps between the respective circumferentially adjacent first protrusions 50b. While the ball bearing is rotating, the engagement portions 50a slide on the engaging portion 1b, and the first protrusions 50b draw lubricating oil in the above gaps into the above spaces between the first protrusions 50b and the engaging portion 1b. At this time, since the spaces between the engaging portion 1b and the respective first protrusions 50b narrow by the length of (C2−C1), dynamic pressure is generated, thereby producing the wedge effect by which oil film pressure increases. Therefore, thick oil films are formed to completely separate the first protrusions 50b and the engaging portion 1b from each other, so that the friction condition between the engagement portions 50a and the engaging portion 1b becomes fluid lubrication condition.

In the shown example, in view of the circumferential lengths of the engagement portions 50a, two or more first protrusions 50b are disposed to be spaced apart from each other on each engagement portion 50a so that the engagement portion 50a is capable of abutting against the engaging portion 1b only at the first protrusions 50b. However, if the engagement portions 50a have short circumferential lengths, a single first protrusion on each engagement portion 50a will allow the engagement portion 50a to abut against the engaging portion 1b only at this single first protrusion. Of course, in order to promote oil film formation, two or more of the first protrusions 50b are preferably formed to be spaced apart from each other on each engaging portion 50a, because, to promote oil film formation, each adjacent pair of the first protrusions 50b preferably move, at short time intervals, past a certain point of the receiving surface of the engaging portion 1b one after another.

Also, as illustrated in FIG. 15, the first protrusions 50*b* each preferably has a semicircular shape in any cross section along the circumferential direction. This is because, if the first protrusions are pointed, while the ball bearing is rotating at a high speed, due to thrust forces applied from the balls to the cage 50 in the other axial direction, the pointed distal ends of the first protrusions will be pushed against an oil film, so that the oil film could break easily.

Also, in order to realize fluid lubrication condition, the difference in peripheral speed between the engagement portions 50*a* and the engaging portion 1*b* is also important. Thus, if the outer bearing ring 1 is the stationary ring, the first protrusions 50*b* are particularly effective in realizing fluid lubrication condition.

The second protrusions 50*c* strengthen the pumping action by which lubricating oil is fed in the other axial direction, based on the difference in peripheral speed due to the inclination of the second protrusions. If the spaces between the engagement portions 50*a* and the groove are narrowed as with the spaces between the first protrusions 50*b* and the engaging portion 1*b*, the second protrusions 50*c* are effective to allow the friction condition between the side surface of the engagement portion 50*a* on its one axial side, and the bearing ring 1 to become fluid lubrication condition. If a clearance is set such that the side surface of each engagement portion 50*a* on its one axial side never slides on the bearing ring, the protrusions on the side surface of the engagement portion 50*a* on its one axial side are not necessary.

As described above, in the ball bearing of the sixth embodiment, because (i) the engagement portions 50*a* include first protrusions 50*b* defining, between the first protrusions 50*b* and the engaging portion 1*b*, spaces which narrow, in axial length, in the circumferential direction, and (ii) an axial clearance C1 is set between the engaging portion 1*b* and the first protrusions 50*b*, an oil film is formed between the surface of each engagement portion 50*a* and the surface of the engaging portion 1*b* that are circumferentially slidable relative to each other. Also, because the first protrusions 50*b* draw lubricating oil into the narrow portions of the above spaces, thereby producing wedge effect by which dynamic pressure is generated. This in turn promotes the growth of the oil films, and thus prevents wear of the engaging portions 1*b* and the engagement portions 50*a*. Also, when the difference in peripheral speed between the engaging portion 1*b* and the engagement portions 50*a* becomes a predetermined value or more, the thicknesses of the oil films increase to such an extent that the engagement portions 50*a* and the engaging portion 1*b* are completely separated from each other by the oil films, that is, the friction condition between the engagement portions 50*a* and the engaging portion 1*b* becomes fluid lubrication condition. In this lubrication condition, because, when the engagement portions 50*a* and the engaging portion 1*b* restrict the movement of the cage 50 in the other axial direction, they engage with each other via the oil films, it is possible to prevent wear of the engagement portions 50*a* and engaging portion 1*b*.

Figure 16:
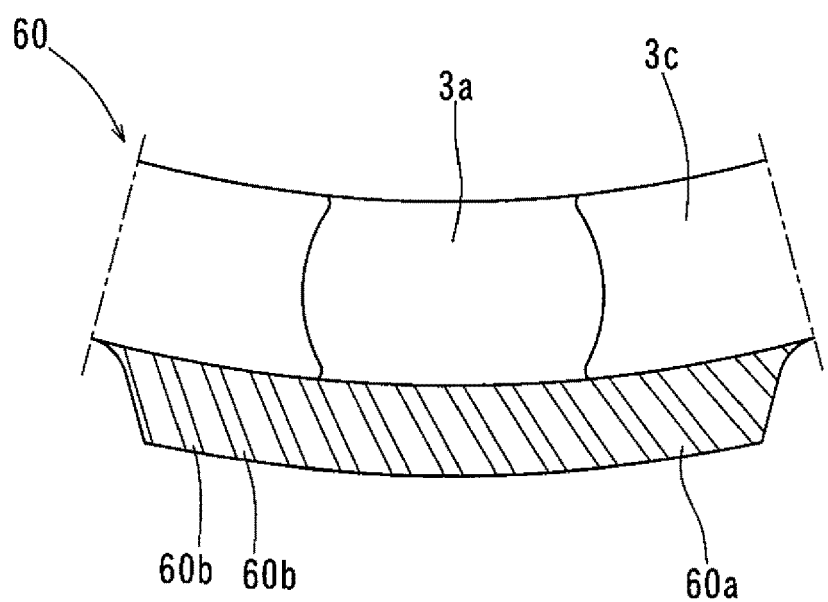
FIG. 16 is a left side view of the engagement portions of a cage according to a seventh embodiment of the present invention.

While protrusions extending straight in radial directions are used in the sixth embodiment, protrusions by which pumping action is obtained may be used instead. The seventh embodiment shown in FIG. 16 is such an example.

Each engagement portion 60*a* of the cage 60 of the seventh embodiment includes protrusions 60*b* extending in a direction inclined in one of the two opposite circumferential directions toward the distal end of the engagement portion 60*a*. During rotation of the ball bearing, radial energy toward the distal ends of the engagement portions 60*a* is applied to lubricating oil from the protrusions 60*b*, thereby producing pumping action by which the lubricating oil is sent to the distal ends of the engagement portions 60*a*. While, in the shown example, only the protrusions 60*b*, which correspond to the second protrusions of the sixth embodiment, are arranged to produce pumping action, the first protrusions of the cage 60 may be also arranged to produce pumping action as with the protrusions 60*b*.

Figure 17:
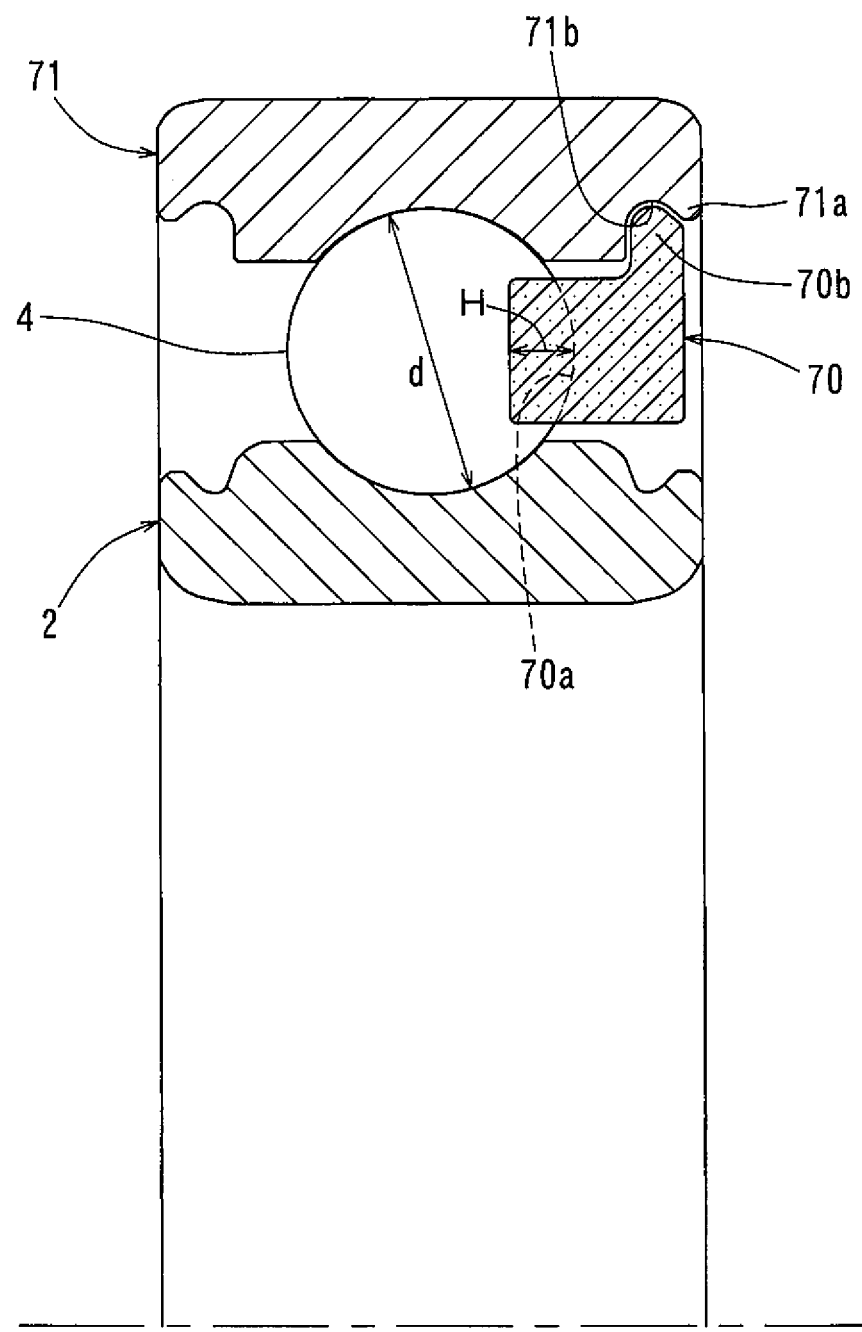
FIG. 17 is a sectional view of a ball bearing according to an eighth embodiment of the present invention.

While a groove 1*c* as shown in FIG. 5 is used in the above first embodiment, instead of such a groove 1*c*, a general seal groove may be used as it is. The eighth embodiment shown in FIG. 17 is such an example.

In the cage 70 of the eighth embodiment, each pocket 70*a* has a depth H of 0.25d or less. Because such reduced depth results in increased thrust forces applied to the cage 70 from the balls 4 in the other axial direction compared to the first embodiment, the ring portion of the cage 70 has an increased thickness in the one axial direction.

The outer bearing ring 71 is a bearing ring for a general bearing with a seal. The engaging portion 71*a* constitutes the portion of the bearing ring 71 on the other axial side of a seal-mounting groove 71*b*. Such a seal-mounting groove 71*b* generally has a shape satisfying the relation θ1>θ2, where θ1 and θ2 are inclination angles shown in FIG. 5.

The ball bearing of the eighth embodiment can be manufactured at low cost, because it is possible to use, as the bearing ring 71, a bearing ring for a general bearing with a seal.

Each of the above-described embodiments may be combined with one or more of the other embodiments as necessary. For example, the protrusions for lubrication according to the sixth or seventh embodiment may be used in any of the first to fifth and eighth embodiments.

While in the first embodiment, the chamfer 1*g* is used for easy mounting of the cage 3, and the receiving surface 1*d* is used to reduce the possibility of separation of the cage 3, these techniques are also applicable to a component other than a cage irrespective of whether or not the present invention is used. For example, these techniques can be used to attach an annular bearing component such as a seal or a shield to a bearing ring.

As an exemplary ball bearing according to the above-described second means of the present invention, the ninth embodiment is now described with reference to FIGS. 18 to 21. Only the features of the ninth embodiment different from those of the first embodiment are described below.

Figure 18:
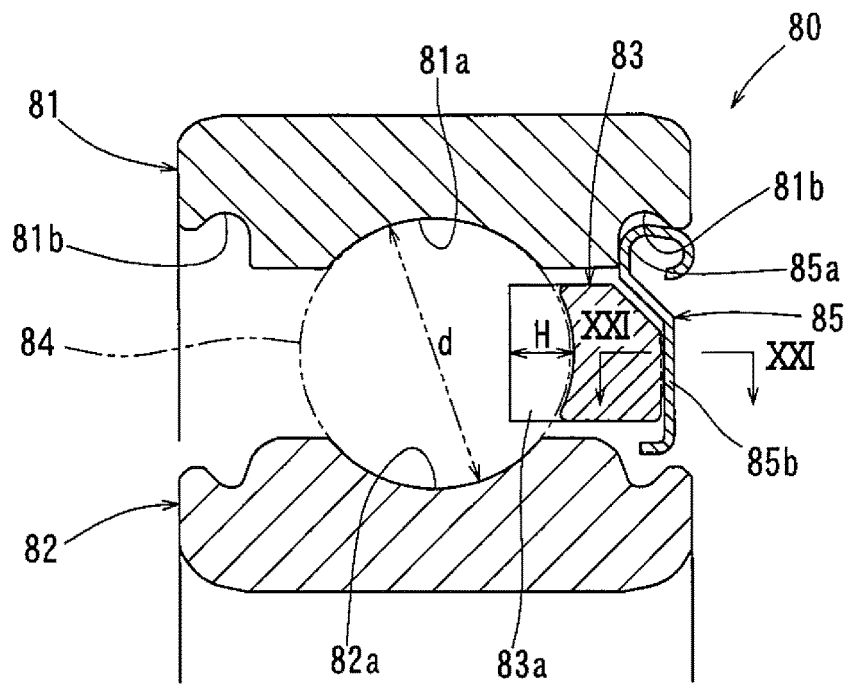
FIG. 18 is a sectional view of a ball bearing according to a ninth embodiment of the present invention.

The ball bearing 80 of FIG. 18 includes outer and inner bearing rings 81 and 82 for a deep groove ball bearing and for a shield ball bearing. The outer bearing ring 81 has a raceway surface 81*a* comprising a raceway groove having a circular arc-shaped cross section, and the inner bearing ring 82 has a raceway surface 82*a* comprising a raceway groove having a circular arc-shaped cross section.

It is assumed that the ball bearing 80 shown is operable at 2.2 million dmn. Therefore, the ball bearing 80 uses an oil lubrication method in which lubricating oil (not shown in this and subsequent embodiments) lubricates the bearing interior.

The cage 83 of the ball bearing 80 between the bearing rings 81 and 82, is preferably made of a fiber-reinforced resin if the ball bearing is intended for high-speed rotation.

Figure 19:
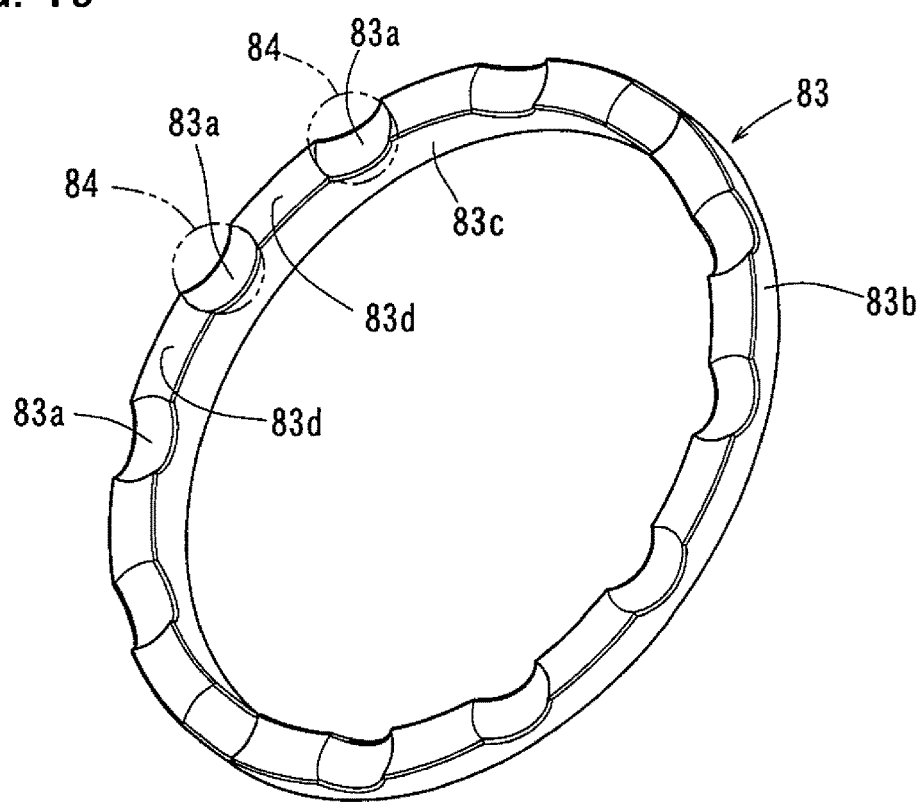
FIG. 19 is a perspective view illustrating the one axial side of the cage of FIG. 18.
Figure 20:
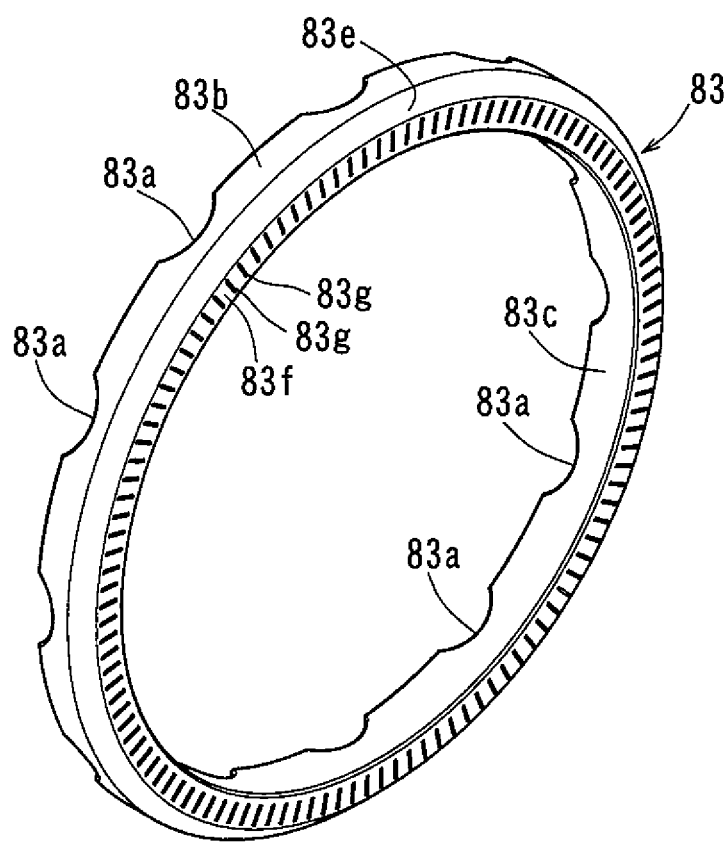
FIG. 20 is a perspective view illustrating the other axial side of the cage of FIG. 18.

As illustrated in FIGS. 19 and 20, the cage 83 has cylindrical surfaces 83*b* and 83*c* on the respective portions of the outer and inner peripheries thereof located on the other axial side of the pockets 83*a*. The outer cylindrical surface 83*b* defines the outer diameter of the cage 83. The inner cylindrical surface 83*c* defines the inner diameter of the cage 83. Of the outer periphery of the cage 83, the radially outer surface between each circumferentially adjacent pair of pockets 83*a* is a circular arc-shaped surface equal in diameter to the outer cylindrical surface 83*b*. Of the inner periphery of the cage 83, the radially inner surface between each circumferentially adjacent pair of pockets 83*a* is a circular arc-shaped surface equal in diameter to the inner cylindrical surface 83*c*.

As illustrated in FIG. 19, of the side surface of the cage 83 on the one axial side, the portion between the distal ends of each circumferentially adjacent pair of pockets 83*a* is a circular arc-shaped width surface 83*d* continuously extending in the circumferential direction. The "width surface" refers to the surface of a member at one of the two ends thereof defining the width (entire axial length) of the member.

With the cage 83 of the shown example, the relationship between the axial depth H of each pocket 83*a* and the ball diameter d of the ball 84 is set at H=0.25d or less.

By using the below-described structure which enables the cage 83 to engage with one of the outer and inner bearing rings 81 and 82 in the other axial direction so as to restrict, utilizing this engagement, the movement of the cage 83 in the other axial direction, it is possible to set the relationship between the axial depth H and the ball diameter d at H≤0.65d.

Specifically, the ball bearing 80 further includes an engaging member 85 attached to the outer bearing ring 81. The outer bearing ring 81 has, on the other axial side of its raceway surface 81*a*, a shield groove 81*b* having a depth in the radial direction, and extending continuously around the entire circumference of the outer bearing ring 81. The shield groove 81*b* is located between a shoulder forming the raceway surface 81*a* and the width surface of the bearing ring 81 on the other axial side thereof, and has the shown sectional shape over the entire circumference.

The engaging member 85 is a shield formed of a metal plate and attached to the shield groove 81*b*. The shown engaging member 85 is generally referred to as "Z shape", and is integrally formed in its entirety by pressing a cold-rolled steel plate.

The engaging member 85 includes a proximal end portion 85*a* retained in the shield groove 81*b*, and an opposed portion 85*b* disposed on the other axial side of the cage 83.

By being crimped to the shield groove 81*b*, the proximal end portion 85*a* is retained in the shield groove 81*b* so as to be movable in neither of the two opposite axial directions.

The opposed portion 85*b* is disposed on the other axial side of the cage 83 so as to restrict the movement of the cage 83 in the other axial direction. The opposed portion 85*b* as a part of a Z-shield is constituted by a circular annular plate portion extending continuously around the entire circumference, and an inclined plate portion inclined in the one axial direction from the circular annular plate portion toward the proximal end portion 85*a*. The side surface of the opposed portion 85*b* on its one axial side includes a circular annular surface 85*c* extending in the radial direction and extending continuously around the entire circumference.

In order for the engaging member 85 to function as a shield, the engaging member 85 has a distal end portion bent in the one axial direction froth the opposed portion 85*b* so as to define a labyrinth seal between this distal end portion and the inner bearing ring 82. The distal end portion of the engaging portion 85 is located between the cage 83 and the inner bearing ring 82. The distal end portion of the engagement member 85 and the inclined plate portion of the opposed portion 85*b* are effective to improve the deformation resistance of the opposed portion 85*b* to an induced thrust load, and reduce the inclination of the opposed portion 85*b* when restricting the movement of the cage 83 in the other axial direction.

Figure 21:
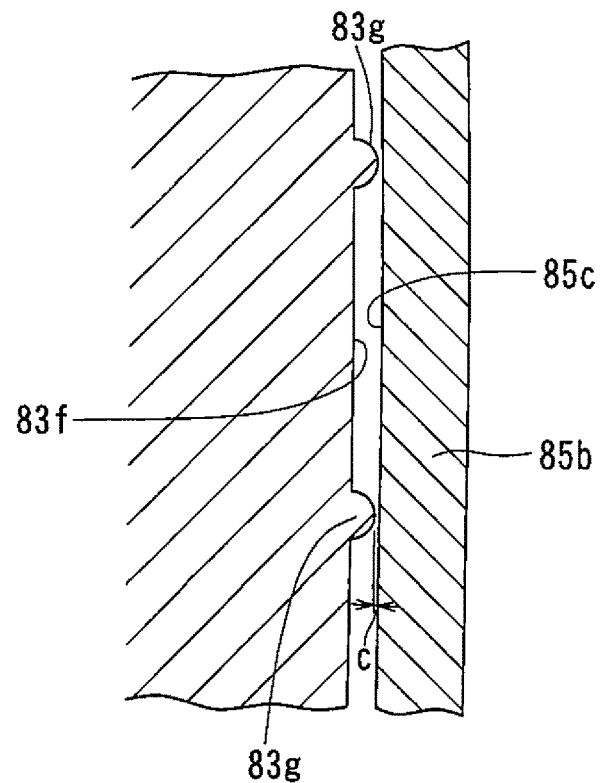
FIG. 21 is a partially enlarged sectional view taken along line XXI-XXI of FIG. 18.

As illustrated in FIGS. 18 and 21, radial and axial clearances are defined between the cage 83 and the engaging member 85. Thus, lubricating oil for lubricating the bearing interior is supplied between the cage 83 and the engaging member 85. Because, when the cage 83 rotates at a high speed, lubricating oil rotated together with the cage 83 is sent to the outer bearing ring 81 due to a centrifugal force, lubricating oil easily flows toward the space between the cage 83 and the engaging member 85.

The cage 83 may be a rolling element-guided type or a bearing ring-guided type. If clearances larger than the pocket gaps are set between the cage 83 and the outer bearing ring 81, between the cage 83 and the inner bearing ring 82, and between the cage 83 and the engaging member 85, the cage 83 is the rolling element-guided type, i.e., radially guided by the balls 84. If the cage 83 is the rolling element-guided type as in the shown example, since the radial clearance between the engaging member 85 and the cage 83 is larger than the pocket gaps, the engaging member 85 is not radially pushed strongly by the cage 83 being guided by the balls 84. Also, it is possible to ensure gaps between the cage 83 and the respective bearing rings 81 and 82, and to ensure flow paths through which lubricating oil flows into the space between the engaging member 85 and the cage 83.

The opposed portion 85*b* of the engaging member 85 is axially opposed to the side surface of the cage 83 on its other axial side. As illustrated in FIGS. 18 and 20, the side surface of the cage 83 on its other axial side comprises a surface portion extending between the peripheral edges of the cylindrical surfaces 83*b* and 83*c* on the other axial side of the cage. The outer cylindrical surface 83*b* has a width shorter than that of the inner peripheral cylindrical surface 83*c*. The cage 83 has an inclined surface 83*e* extending from the peripheral edge of the outer cylindrical surface 83*b* on the other axial side of the cage. The inclined surface 83*e* is inclined, at a predetermined angle, radially inwardly in the other axial direction. The cage 83 has a flat surface 83*f* disposed between the inclined surface 83*e* and the inner cylindrical surface 83*c* so as to extend in the radial and circumferential directions; and two or more protrusions 83*g* each having a height from the flat surface 83*g* in the other axial direction.

As illustrated in FIGS. 20 and 21, the protrusions 83*g* are spaced apart from each other in the circumferential direction. Each protrusion 83*g* has a predetermined axial height from the flat surface 83*f*, and extends straight in the radial direction. As illustrated in FIG. 21, each protrusion 83*g* defines, between the protrusion 83*g* and the circular annular surface 85*c* of the opposed portion 85*b*, wedge-shaped spaces which narrow in axial length in the circumferential direction.

The wedge shape of each wedge-shaped space is defined based on the wedge angle defined by the circular annular surface 85*c* and a tangent line tangent to the protrusion 83*g*, when seen in the cross section of FIG. 21. Because the protrusion 83*g* has a semicircular shape in any cross section along the circumferential direction, the wedge angle is smaller at a position closer to the distal end (axially highest position) of the protrusion 83*g*. Since the protrusion 83*g* has a shape allowing the wedge angle to gradually decrease, the protrusion 83*g* does not have a pointed distal end pointed toward the circular annular surface 85*c*. Therefore, even though, during high-speed rotation of the ball bearing the distal ends of the protrusions 83g are pushed against the oil film by an induced thrust load, the oil film does not break.

The above axial clearance c is defined between the circular annular surface 85c of the opposed portion 85b and the distal ends of the protrusions 83g. Of the side surface of the cage 83 on its other axial side, the portion other than the protrusions 83g is unable to come into contact with the engaging member 85 in the axial direction.

During rotation of the ball bearing 80, lubricating oil flows into the gaps between the respective adjacent pairs of protrusions 83g, and, due to the rotation of the cage 83, the protrusions 83g slide relative to the circular annular surface 85c of the opposed portion 85b. The protrusions 83g draw lubricating oil in the above gaps into the spaces between the protrusions 83g and the circular annular surface 85c. In particular, the lubricating oil is drawn into the narrow portions of the above wedge-shaped spaces, and thus dynamic pressure is generated, thereby producing wedge effect by which the pressure in the oil films between the protrusions 83g and the circular annular surface 85c increases. This wedge effect promotes the growth of such oil films, i.e., increases their thicknesses. Also, when the (plural) protrusions 83g circumferentially rotate at a high speed, an oil film extending continuously around the entire circumference is formed on the circular annular surface 85c, and the wedge effect due to the protrusions 83g is produced without interruption. Therefore, when the difference in peripheral speed between the cage 83 and the engaging member 85 becomes a predetermined value or more, an oil film is formed to completely separate the protrusions 83g and the circular annular surface 85c from each other. That is, the friction condition between the cage 83 and the engaging member 85 becomes fluid lubrication condition.

Figure 2:
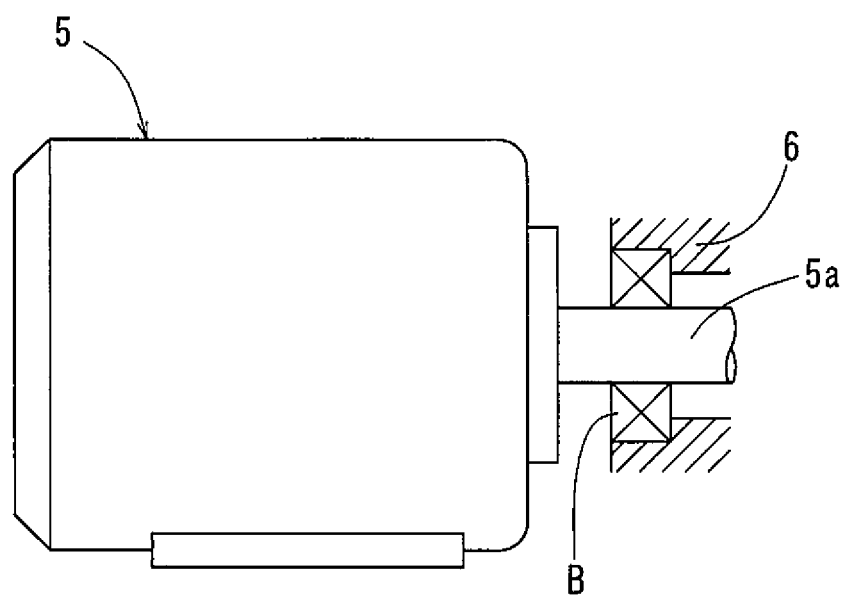
FIG. 2 is a conceptual view exemplifying how the ball bearing of the first embodiment is used.

In order to realize fluid lubrication condition, the difference in peripheral speed between the cage 83 and the engaging member 85 is also important. Thus, if the outer bearing ring 81 is the stationary ring, the protrusions 83g are particularly effective in realizing fluid lubricating condition. For example, if, when the rotary shaft 5a of the motor 5 shown in FIG. 2 is rotating at 800 rpm, the friction condition between the cage 83 and the engaging member 85 shown in FIG. 18 becomes fluid lubrication condition, this means that, in a short time after the electric motor 5 is started, a situation is created in which the protrusions 83 and the circular annular surface 85c do not substantially become worn. The pitches between the adjacent protrusions 83g, the axial heights and sectional shapes of the protrusions 83a, etc. are not limited to those shown, provided that the protrusions 83g can realize fluid lubrication condition in view of predetermined lubricating oil, oil temperature, and difference in peripheral speed.

When the cage 83 receives an induced thrust load consisting of the combination of the component forces applied in the other axial direction from the balls 84, and thus the cage 83, shown in FIG. 18, tends to move in the other axial direction by more than the clearance C, the protrusions 83g, shown in FIG. 21, come into contact, if in non-fluid lubricating condition, with the circular annular surface 85c of the opposed portion 85b in the other axial direction, or, if in fluid lubrication condition, engage, via the oil film, i.e., without coming into contact, with the opposed portion 85b. Due to this engagement, it is possible to prevent further movement of the cage 83 (see FIG. 18, too) in the other axial direction, and thus to prevent separation of the cage 83 in the other axial direction.

Of course, the axial clearance c is set at a value within the range in which, with the protrusions 83g engaged with the opposed portion 85b, the pockets 83, a can maintain the circumferential positions of the balls 84. Also, in order to realize fluid lubrication condition, the axial clearance c is set to be sufficiently larger than 1.5 μm.

Because, as described above, (i) the ball bearing 80 includes an engaging member 85 attached to one of the inner and outer bearing rings 82 and 81, i.e., to the outer bearing ring 81 in the embodiment, and (ii) the engaging member 85 includes an opposed portion 85b disposed on the other axial side of the cage 83 so as to restrict the movement of the cage 83 in the other axial direction, it is possible to restrict the movement of the cage 83 (shown in FIGS. 18 and 21) in the other axial direction by means of the engagement of the cage 83 and the opposed portion 85b of the engaging member 85. As a result, the relationship between the axial depth H of each pocket 83a, which is open to the side surface of the cage 83 on its one axial side, and the diameter d of the corresponding ball 84 can be set at H≤0.65d. With the ball bearing 80, since the relationship between H and d is set at H≤0.65d, it is possible to shorten the axial lengths of the protruding portions of the cage 83 defining the pockets 83a, and thus reduce their weight, thereby reducing deformation of the cage 83 due to a centrifugal force. Also, it is possible to reduce the shear resistance of lubricating oil between the balls 84 and the pockets 83a. Moreover, since the relationship between H and d is set at 0.15d≤H, the cage 83 can keep its inherent function of maintaining the circumferential positions of the balls 84 in the respective pockets 83a.

Especially with the ball bearing 80 in which the above relationship is set at H≤0.5d, it is possible to further reduce the above shear resistance and deformation of the cage 83 due to a centrifugal force, and also to improve the dimensional accuracy of the pockets 83a if the cage is formed by injection molding.

Also, with the ball bearing 80 in which the above relationship is set at H<0.5d, the cage 83 does not include claws as seen in conventional crown-shaped cages. Thus, it is possible to easily place the balls 84 in the respective pockets 83a of the cage 83, by simply placing, relative to the balls 84 between the bearing rings 81 and 82, the cage 83 at a predetermined position, without pushing the balls 84 into the pockets 83a. With the cage 83 thus placed at the predetermined position, the cage 83 is attached to the outer bearing ring 81 by press-fitting the engaging member 85 into the shield groove 81b. In this state, the cage 83 is no longer separable from the bearing. In this way, it is possible to assemble the ball bearing 80 easily and reliably.

Also, with the ball bearing 80, because (i) an axial clearance C is defined between the engaging member 85 and the cage 83, and (ii) one of the opposed portion 85b of the engaging member 85, and the cage 83, which is the cage 83 in the embodiment, includes two or more protrusions 83g arranged circumferentially spaced apart from each other, and each defining, between the protrusion 83g and the other of the opposed portion 85b and the cage 83, which is the opposed portion 85b in the embodiment, spaces which narrow in axial length in the circumferential direction, when lubricating oil flows into the gaps between the opposed side surfaces of the opposed portion 85b and the cage 83, and is drawn into the narrow portions of the wedge-shaped spaces between the opposed portion 85b and the protrusions 83g, the wedge effect is produced. The wedge effect accelerates the formation of oil films between the opposed two side surfaces of the opposed portion 85b and the cage 83, and thus prevents wear of the opposed portion 85b and the cage 83.

Especially when the difference in peripheral speed between the cage 83 and the engaging member 85 becomes a predetermined value or more, since the circumferentially spaced apart protrusions 83g draw lubricating oil while circumferentially rotating at a high speed, a circumferentially continuously extending oil film is formed on the opposed portion 85b, and the wedge effect is produced without interruption, so that the friction condition between the cage 83 and the engaging member 85 becomes fluid lubrication condition. In this lubrication condition, it is possible to restrict the movement of the cage 83 in the other axial direction due to the non-contact engagement of the opposed portion 85b and the cage 83 via the oil film. Therefore, it is possible to prevent the above wear even while the ball bearing 80 is rotating at a high speed.

Also, with the ball bearing 80, since the protrusions 83g are formed on the cage 83, it is only required to prepare, as the cage 83, a cage integrally formed with these protrusions. Thus, it is possible to use, as the engaging member 85, a general-purpose component.

Also, with the ball bearing 80, because (i) the outer bearing ring 81, as the above-mentioned one of the two bearing rings, has, on the other axial side of its raceway surface 81a, a shield groove 81b having a depth in the radial direction, and extending continuously around the entire circumference of the outer bearing ring, and (ii) the engaging member 85 is a shield formed of a metal plate and attached to the shield groove 81b, it is possible to prepare the one of the bearing rings, i.e., the bearing ring 81, and the engaging member 85 based on the specifications of a bearing ring and a shield for a known ball bearing with a shield. Also, since it is possible to mount the engaging member 85 in position by simply placing the engaging member 85 on the other axial side of the cage 83, it is possible to use the axial layout of a general ball bearing with a shield, and also to use, as the assembly line and assembling steps of the ball bearing 80, those of ball bearings including a conventional crown-shaped cage.

Also, with the ball bearing 80, since the engaging member 85 functions as a shield, too, it is possible to prevent lubricating oil from excessively flowing into the bearing from outside the bearing by using the engaging member 85, and thus to reduce the stirring resistance of lubricating oil due to the balls 84, as a countermeasure for reduction in rotation torque of the ball bearing 80 and heat generation during normal rotation.

Figure 22:
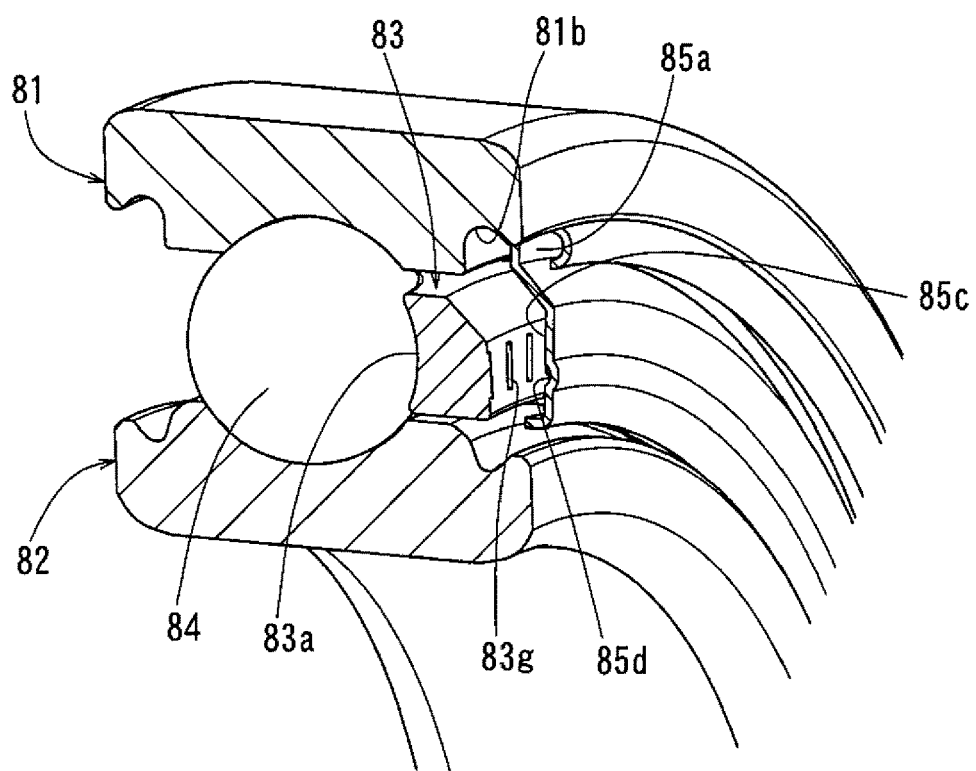
FIG. 22 is a sectional perspective view of a ball bearing according to a tenth embodiment of the present invention.

While a general Z shield is used as the engaging member 85 in the ninth embodiment, a specially designed shield may be used as the engaging member. The tenth embodiment shown in FIG. 22 is such an example. Only the features of the tenth embodiment different from those of the ninth embodiment are described below.

The opposed portion of the engaging member according to the tenth embodiment includes a rib 85d recessed from its circular annular surface 85c toward the other axial side. The rib 85d is formed on a metal plate so as to define a circumferentially extending groove. In the tenth embodiment, the rib 85d improves the deformation resistance of the opposed portion when restricting the movement of the cage 83, while receiving an induced thrust load. Due to this, it is possible to reduce the inclination, relative to the radial direction, of the circular annular surface 85c of the opposed portion, and thus to appropriately maintain the wedge-shaped spaces between the circular annular surface 85c and the protrusions 83g. Also, since the rib 85b also functions as a groove in which lubricating oil remains, lubricating oil can exist abundantly between the protrusions 83g and the circular annular surface 85c so as to promote oil film formation. While a single rib 85d is shown which is disposed at a radially inner position of the circular annular surface 85c, and which extends continuously around the entire circumference, circumferentially separated ribs may be used instead.

While the protrusions are formed on the cage in each of the above ninth and tenth embodiments, two or more such protrusions may be formed on the side surface of the engaging member on its one axial side, with the circular annular surface formed on the side surface of the cage on its other axial side.

Also, while a shield is used as the engaging member in each of the ninth and tenth embodiments, a general-purpose component other than a shield, or a component exclusively for restricting cage movement may be used as the engaging member.

The eleventh embodiment is now described with reference to FIGS. 23 to 28. Only the features of the eleventh embodiment different from those of the ninth embodiment are described below.

Figure 23:
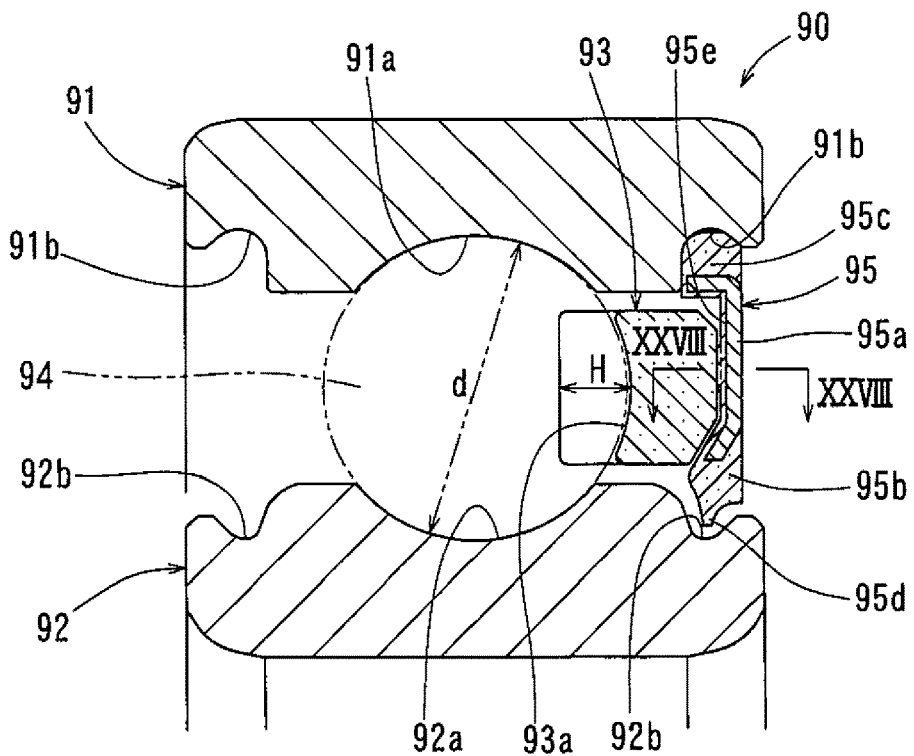
FIG. 23 is a sectional view of a ball bearing according to an eleventh embodiment of the present invention.
Figure 24:
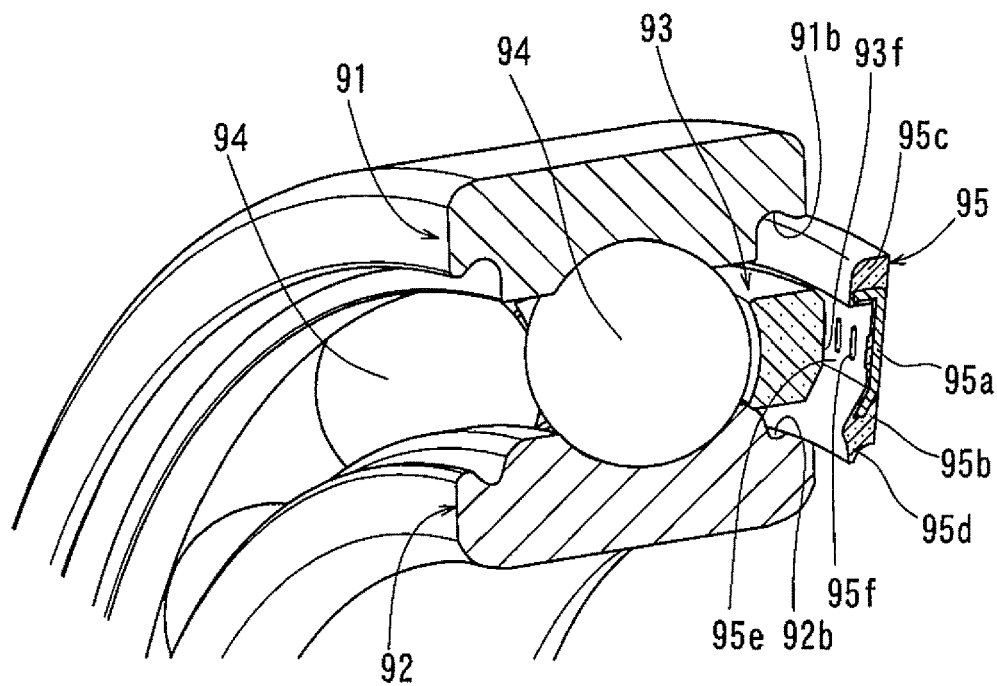
FIG. 24 is a sectional perspective view of the ball bearing of FIG. 23.
Figure 25:
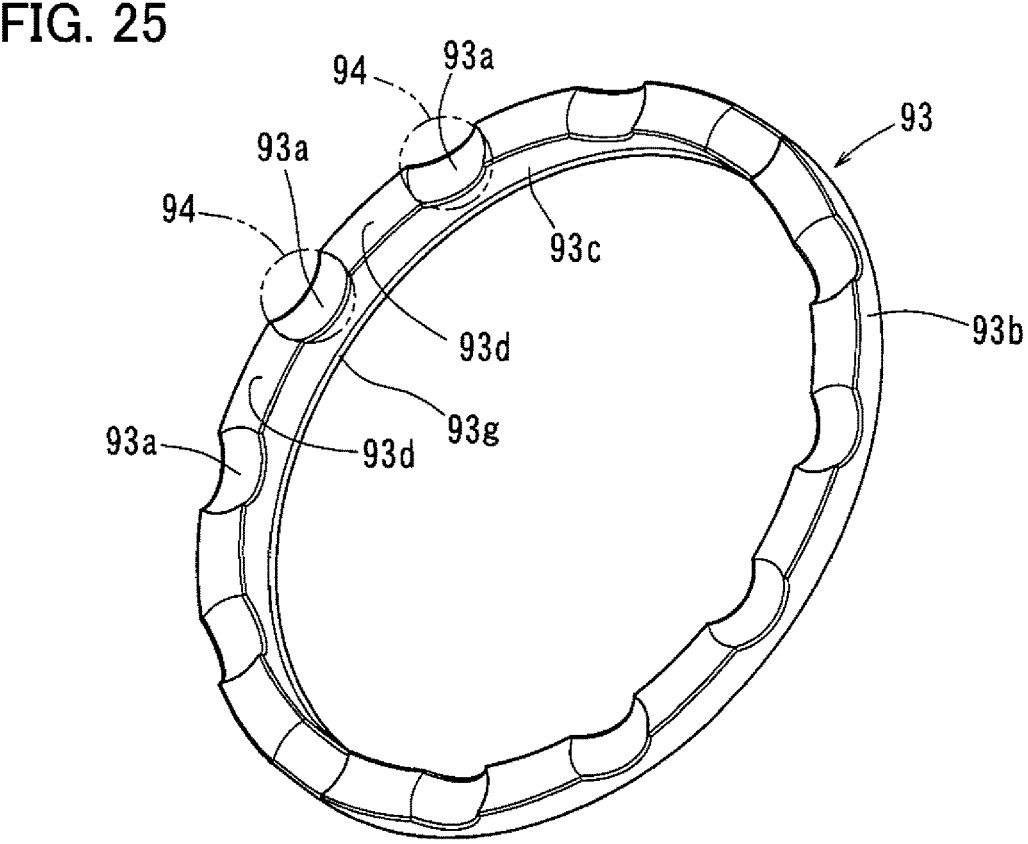
FIG. 25 is a perspective view illustrating the one axial side of the cage of FIG. 23.

The ball bearing 90 shown in in FIGS. 23 to 25 includes, as its outer and inner bearing rings 91 and 92, bearing rings for a deep groove ball bearing and for a bearing with a seal.

Figure 26:
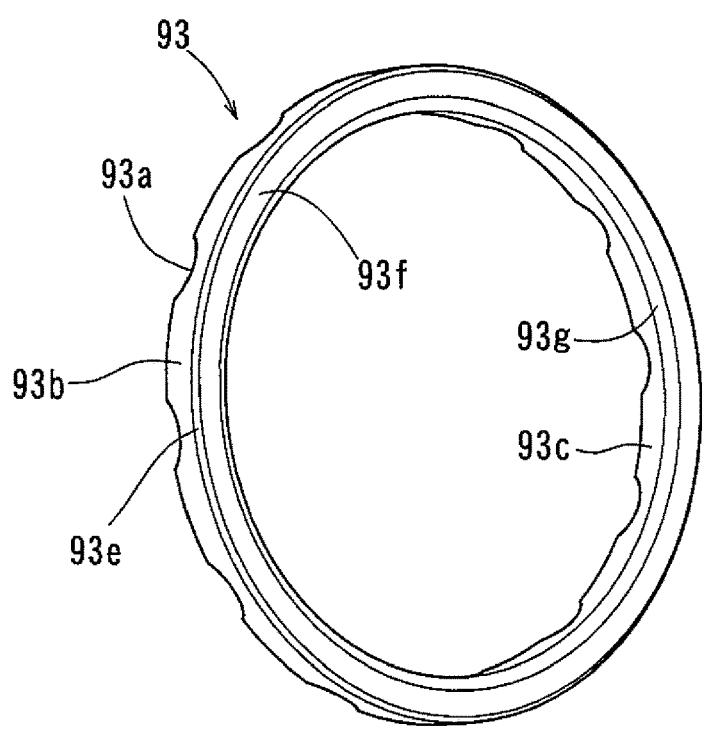
FIG. 26 is a perspective view illustrating the other axial side of the cage of FIG. 23.

As illustrated in FIGS. 23 and 26, the side surface, on the other axial side, of the cage 93 (of the ball bearing 90) comprises a surface portion extending between the peripheral edges of the cylindrical surfaces 93b and 93c on the other axial side of the cage. The cage 93 has an inclined surface 93e extending from the peripheral edge of the outer cylindrical surface 93b on the other axial side of the cage. The inclined surface 93a is inclined, at a predetermined inclination angle, radially inwardly in the other axial direction. The cage 93 has a flat surface 93f extending from the inclined surface 93e along the radial and circumferential direction. The flat surface 93f continuously extends with a constant width, around the entire circumference. The cage 93 has an inclined surface 93g extending to the flat surface 93f from the peripheral edge of the inner cylindrical surface 93c on the other axial side of the cage. The inclined surface 93g is inclined, at a predetermined inclination angle, radially outwardly and in the other axial direction.

As illustrated in FIGS. 23 and 24, the outer bearing ring 91 has, on the other axial side of its raceway surface 91a, a seal groove 91b having a depth in the radial direction, and extending continuously around the entire circumference of the outer bearing ring. The seal groove 91b is located between a shoulder defining the raceway surface 91a and the width surface of the bearing ring 91 on the other axial side thereof, and has the shown sectional shape over the entire circumference.

The engaging member 95 is a seal attached to the seal groove 91b, and is constituted by a metal core 95a formed of a metal plate, and an elastomer 95b attached to the metal core 95a. The shown engaging member 95 is a so-called non-contact type, i.e., does not come into contact with the inner bearing ring 92.

The engaging member 95 includes a proximal end portion 95c retained in the seal groove 91b; a seal lip 95d defining a labyrinth seal between the seal lip 95d and an annular groove 92b; and an opposed portion 95e disposed on the other axial side of the cage 93.

The metal core 95a is an annular member extending continuously in the circumferential direction, and is generally formed by pressing a cold-rolled steel plate. The metal core 95a includes a circular annular plate portion extending in the radial direction and around the entire circumference; a proximal end portion bent in the one axial direction from an end portion of the circular annular plate portion closer to the seal groove 91b; and a distal end portion bent in the one axial direction from an end portion of the circular annular plate portion closer to the annular groove 92b. The proximal end portion of the metal core 95a axially extends at a position axially opposed to the outer bearing ring 91. The distal end portion of the metal core 95a is inclined in the one axial direction relative to the radial direction at a position axially opposed to the cage 93. The proximal and distal end portions of the metal core 95a are effective in improving the deformation resistance of the opposed portion 95e to an induced thrust load, and reducing the inclination of the opposed portion 95e when restricting the movement of the cage 93 in the other axial direction.

The elastomer 95b is a polymer having rubber elasticity, and is formed of, e.g., a synthetic rubber such as nitrile rubber (NBR), hydrogenated nitrile rubber (HNBR), or acrylic rubber (ACM). Such synthetic rubber is bonded to the metal core 95a generally by vulcanization molding using a mold.

The proximal end portion 95c is a portion of the elastomer 95b enclosing the proximal end portion of the metal core 95a. By being press-fitted into the seal groove 91b, the proximal end portion 95c is retained in the seal groove 91b so as to be movable in neither of the two opposite axial directions. Due to this retention, the engaging member 95 is attached to the seal groove 91b.

The seal lip 95d is a portion of the elastomer 95b extending into the annular groove 92b from the surface bonded to the distal end portion of the metal core 95a.

The opposed portion 95e is a portion of the engaging member axially opposed to the side surface of the cage 93 on its other axial side, and, in order to be able to restrict the movement of the cage 93 in the other axial direction, the opposed portion includes most of the circular annular plate portion of the metal core 95a and the distal end portion of the metal core 95a. The side surface of the opposed portion 95e on its one axial side is a portion of the elastomer 95b connecting the proximal end portion 95c and the seal lip 95d to each other, and covering the side surface, on the one axial side, of the circular annular plate portion of the metal core 95a.

Figure 27:
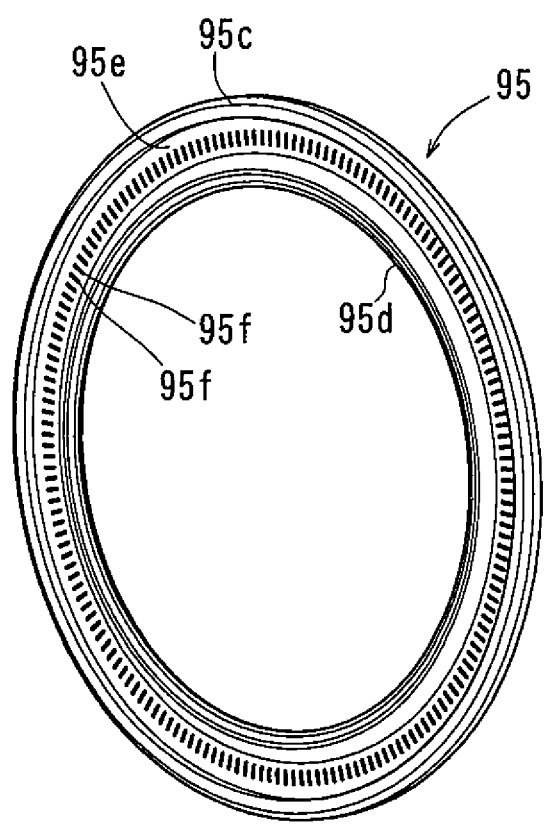
FIG. 27 is a perspective view illustrating the one axial side of the engaging member of FIG. 23.

As illustrated in FIGS. 24 and 27, the opposed portion 95e includes circumferentially spaced apart two or more protrusions 95f each having a predetermined height in the one axial direction, and extending straight in the radial direction.

Figure 28:
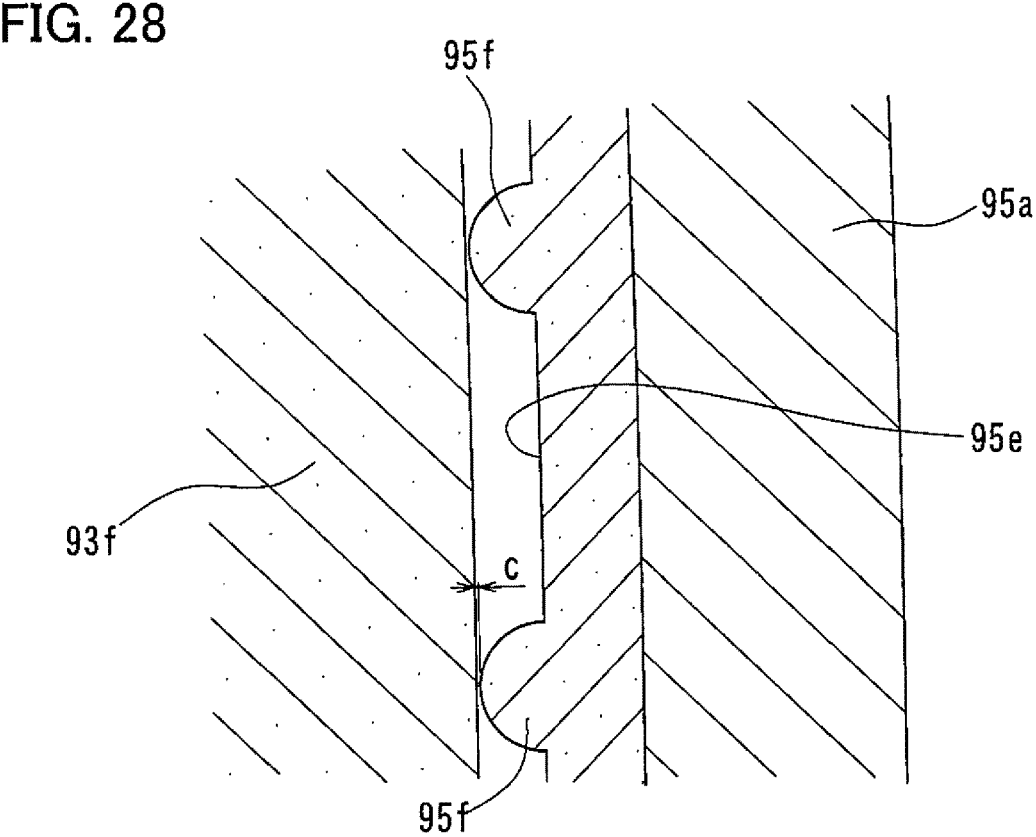
FIG. 28 is a partially enlarged sectional view taken along line XXVIII-XXVIII of FIG. 23.

As illustrated in FIG. 28, each protrusion 95f defines, between the protrusion 95f and the flat surface 93f, wedge-shaped spaces which narrow in axial dimension in the circumferential direction. The wedge shape of each wedge-shaped space is defined based on the wedge angle defined by the flat surface 93f and a tangent line tangent to the protrusion 95f, when seen in the cross section of FIG. 28. The protrusion 95f has a semicircular shape in any cross section along the circumferential direction, which means that the protrusion 95f has a shape allowing the wedge angle to gradually decrease. Thus, it is possible to prevent, as in the ninth embodiment, oil film breakage while the ball bearing 90 is rotating at a high speed.

An axial clearance c is defined between the flat surface 93f and the distal ends of the protrusions 95f. Of the side surface of the engaging member 95 on the one axial side, see in FIGS. 23, 27 and 28, the portions other than the protrusions 95f are unable to come into contact with the cage 93 in the axial direction.

Due to the protrusions 95f and the axial clearance C, it is possible to realize fluid lubrication condition between the cage 93 and the engaging member 95 as in the ninth embodiment. Specifically, during rotation of the ball bearing 90, lubricating oil flows into the gaps between the respective adjacent protrusions 95f, an oil film extending continuously around the entire circumference is formed on the flat surface 93f, and the wedge effect due to the protrusions 95f is produced without interruption. Therefore, when the difference in peripheral speed between the cage 93 and the engaging member 95 becomes a predetermined value or more, an oil film is formed to completely separate the protrusions 95f and the flat surface 93f from each other, that is, the friction condition between the cage 93 and the engaging member 95 becomes fluid lubrication condition. In order to realize fluid lubrication condition, the difference in peripheral speed between the cage 93 and the engaging member 95 is important as in the ninth embodiment, and the pitches between the protrusions 95f, the sectional shapes of the protrusions 95f, etc. are not limited to those shown. Also, the value of the axial clearance c can be set in the same manner as in the ninth embodiment.

When the cage 93 shown in FIG. 23 receives an induced thrust load, and thus tends to move in the other axial direction by more than the clearance C, the flat surface 93f shown in FIG. 28 comes into contact, if in non-fluid lubrication condition, with the protrusions 95f in the other axial direction, and, in fluid lubrication condition, engages, via the oil film, i.e., without contacting, with the protrusions 95f. Due to this engagement, it is possible to prevent further movement of the cage 93 (see FIG. 23, too) in the other axial direction, and thus to prevent separation of the cage 93 in the other axial direction.

With the ball bearing 90, because (i) the outer bearing ring 91, i.e., the above-mentioned one of the two bearing rings, has, on the other axial side of its raceway surface 91a, a seal groove 91b having a depth in the radial direction, and extending continuously around the entire circumference of the outer bearing ring, and (ii) the engaging member 95 is a seal attached to the seal groove 91b, and constituted by a metal core 95a formed of a metal plate, and an elastomer 95b attached to the metal core 95a, it is possible to prepare the outer bearing ring 91 and the engaging member 95 based on the specifications of a bearing ring and a seal for a known ball bearing with a seal, and thus to reduce the cost. Also, since it is possible to mount the engaging member 95 in position by simply placing the engaging member 95 on the other axial side of the cage 93, it is possible to use, without modifying, the axial layout of a general deep groove ball bearing with a seal, and also to use, as the assembly line and assembling steps of the ball bearing 90, those of ball bearings including a conventional crown-shaped cage.

Also, since the ball bearing 90 uses an engaging member 95 which also functions as a seal, it is possible to prevent lubricating oil from excessively flowing into the bearing as a countermeasure for reduction in rotation torque of the ball bearing 90 and heat generation during normal rotation, as in the ninth embodiment.

Also, with the ball bearing 90, since the relationship between the pocket axial depth H and the ball diameter d is set at H<0.5d, it is possible to easily place the balls 94 in the respective pockets 93a as in the ninth embodiment. With the balls 94 placed in the pockets 93a, the cage 93 is attached to the outer bearing ring 91b by press-fitting the engaging member 95 into the seal groove 91b. In this state, the cage 93 is no longer separable. In this way, it is possible to assemble the ball bearing 90 easily and reliably.

Also, with the ball bearing 90, because (i) axial clearance C is defined between the engaging member 95 and the cage 93, and (ii) one of the opposed portion 95e of the engaging member 95 and the cage 93, which is the opposed portion 95e in this embodiment, includes two or more protrusions 95l circumferentially spaced apart from each other, and defining, between the opposed portion 95e and the cage 93, spaces which narrow in axial dimension in the circumferential direction, it is possible to promote the growth of the oil film between the opposed surfaces of the opposed portion 95e and the cage 93, and thus to prevent wear of the opposed portion 95e and the cage 93, as in the ninth embodiment.

Especially when the difference in peripheral speed between the cage 93 and the engaging member 95 becomes a predetermined value or more, as in the ninth embodiment, the friction condition between the cage 93 and the engaging member 95 becomes fluid lubrication condition, and it is possible to restrict the movement of the cage 93 in the other axial direction by means of the non-contact engagement of the opposed portion 95e and the cage 93 via the oil film. Therefore, it is possible to prevent the above wear even while the ball bearing 90 is rotating at a high speed.

Also, with the ball bearing 90, since the opposed portion 95e of the engaging member 95 includes the protrusions 95f, and the protrusions 95f are portions of the elastomer 95b, when forming the elastomer 95b, it is possible to form the protrusions 95f, too. Therefore, it is possible to improve the dimensional accuracy of the protrusions 95f, compared to forming the protrusions on the metal core by pressing.

While the engaging member 95 of the eleventh embodiment is based on the specifications of a general non-contact type of seal, an engaging member may be used which is based on the specifications of a contact type of seal. The twelfth embodiment shown in FIGS. 29 to 32 is such an example. Only the features of the twelfth embodiment different from those of the eleventh embodiment are described below.

Figure 29:
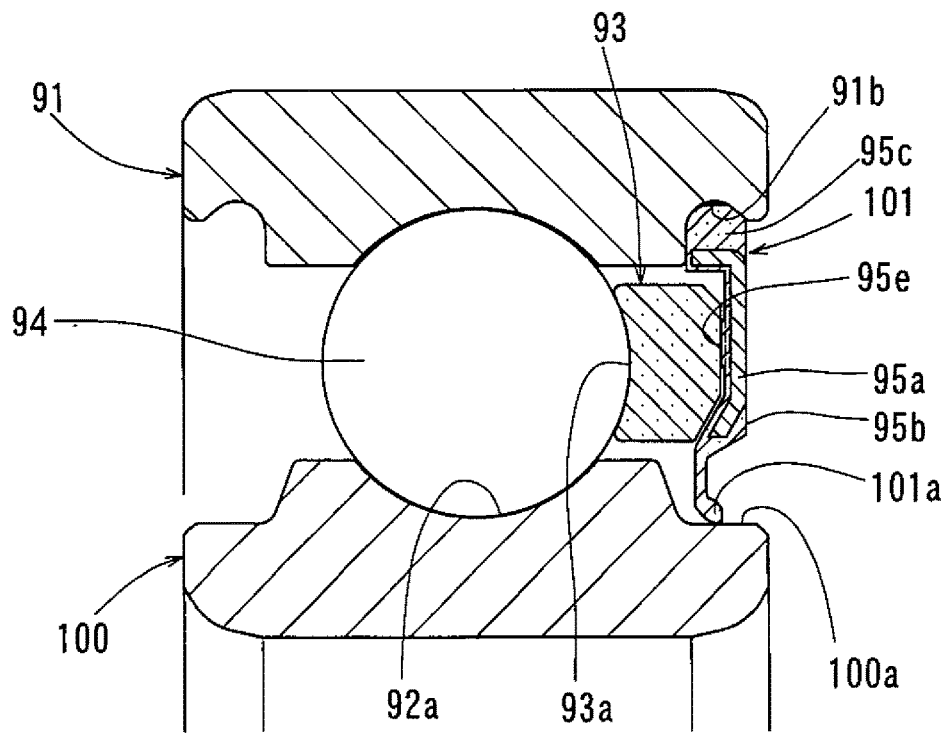
FIG. 29 is a sectional view of a ball bearing according to a twelfth embodiment of the present invention.

As illustrated in FIG. 29, the inner bearing ring 100, as one of the inner and outer bearing rings 100 and 91, which are opposed to each other, has a seal sliding surface 100a extending continuously around the entire circumference of the inner bearing ring. The seal sliding surface 100a is located on the other axial side of the inner raceway surface 92a, and comprises a cylindrical surface connected to a chamfer on the other axial end of the outer periphery of the inner bearing ring 100.

The engaging member 101 includes a seal lip 101a circumferentially slidable relative to the seal sliding surface 100a with interference therebetween.

Figure 30:
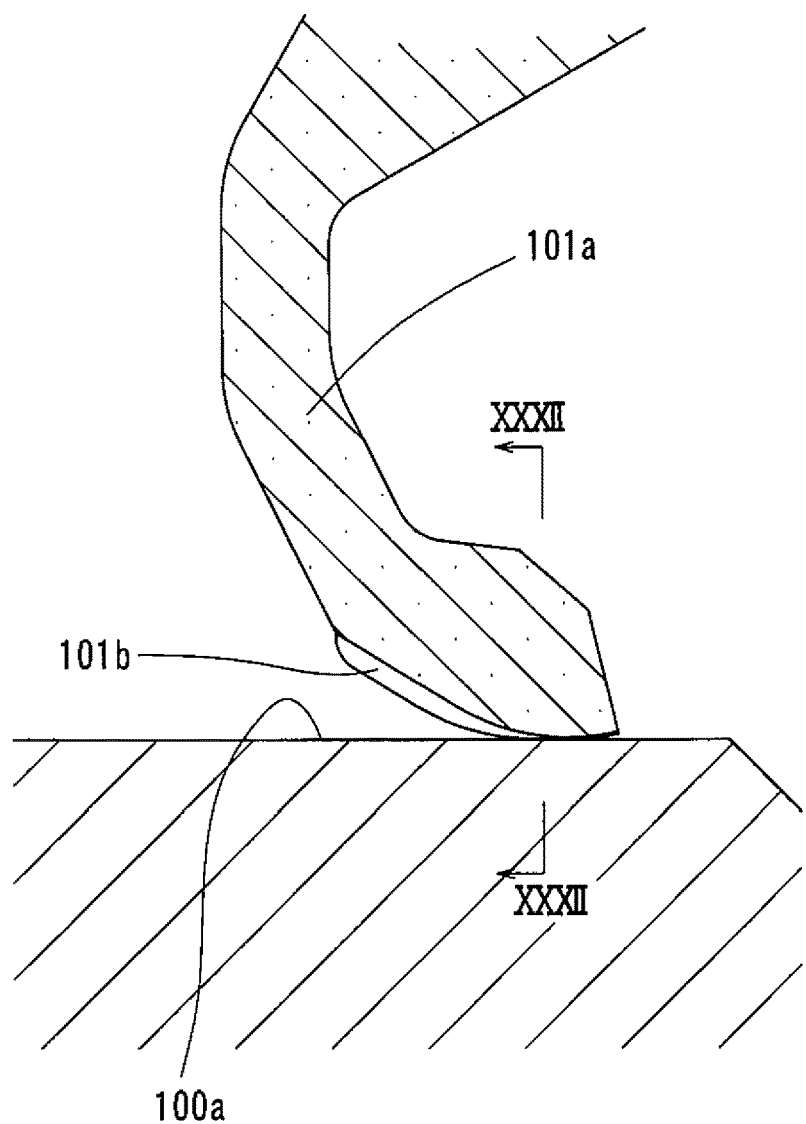
FIG. 30 is an enlarged view illustrating the vicinity of the seal lip of FIG. 29.
Figure 31:
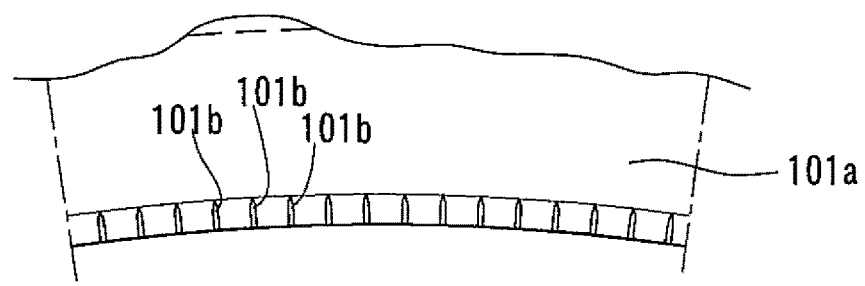
FIG. 31 is a partially enlarged side view of the one axial side of the seal lip illustrated in FIG. 29.
Figure 32:
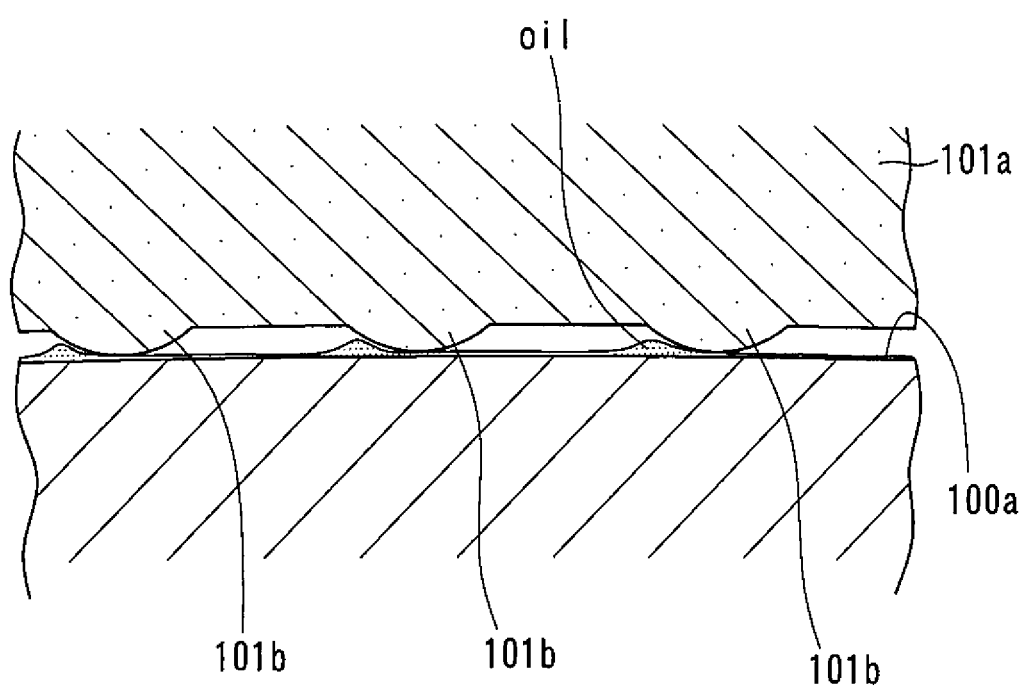
FIG. 32 is a partially enlarged sectional view taken along line XXXII-XXXII of FIG. 30.

As illustrated in FIGS. 30 and 31, the seal lip 101a includes two or more elastic protrusions 101b each defining, between the elastic protrusion 101b and the seal sliding surface 101a, a wedge-shaped spaces which narrows in radial dimension in the circumferential direction. The elastic protrusions 101b each extends in the direction orthogonal to the circumferential direction, and are circumferentially spaced apart from each other. FIG. 31 illustrates the elastic protrusions 101b in their natural state (corresponding to their shapes transferred at the time of molding). In the shown natural state, the elastic protrusions 101b extend straight in radial directions. As illustrated in FIG. 30, the heights of the elastic protrusions 101b gradually decease toward the distal end of the seal lip 101a. As illustrated in FIGS. 30 and 32, oil paths are defined between the respective circumferentially adjacent pairs of elastic protrusions 101b so as to communicate with the interior and exterior of the bearing. The engaging member 101 is circumferentially slidable relative to the inner bearing ring 100 only at the elastic protrusions 101b.

As illustrated in FIG. 32 (and described above), each elastic protrusion 101b defines, between the elastic protrusion 101b and the seal sliding surface 101a, a wedge-shaped spaces which narrows in radial dimension in the circumferential direction. The wedge shape of the wedge-shaped spaces is defined based on the wedge angle defined by the seal sliding surface 100a and a tangent line tangent to the elastic protrusion 101b, when seen in the cross section of FIG. 32. Because the protrusion 101b has a semicircular shape in any cross section along the circumferential direction, the wedge angle is smaller at a position closer to the distal end (axially highest position) of the elastic protrusion 101b. Since the elastic protrusion 101b has a shape allowing the wedge angle to gradually decrease, the elastic protrusion 101b does not have a pointed distal end pointed toward the seal sliding surface 100a. Therefore, even though, while the ball bearing is rotating at a high speed, the distal ends of the elastic protrusions 101b are pushed against the oil film by the tightening force of the seal lip 101a, the oil film does not break. Also, due to such a shape, it is possible to reduce the sliding contact area, which greatly affects the seal torque. The specifications of a seal which enables fluid lubrication, such as the seal lip 101a, are disclosed in, e.g., Japanese Patent Application No. 2016-044050.

When, due to rotation of the bearing, the elastic protrusions 101b of the seal lip 101a drag, relative to the seal sliding surface 100a, lubricating oil in the oil paths, into the narrow portions of the wedge-shaped spaces, the wedge effect is produced, and thus oil film formation is promoted. When the difference in peripheral speed between the engaging member 101 and the inner bearing ring 100 becomes a predetermined value or more, this increases the number of times that the elastic protrusions 101b pass a certain point per rotation, and thus, an oil film is formed which extends continuously around the entire circumference of the seal sliding surface 100a. As a result, the wedge effect is produced without interruption, and the friction condition between the seal lip 101a and the seal sliding surface 100a becomes fluid lubrication condition. Therefore, with the ball bearing of the twelfth embodiment, it is possible to reduce wear of the seal lip 101a, reduce the seal torque to the same level as the eleventh embodiment, so that this ball bearing is capable of coping with high-speed rotation. Also, since heat generation is reduced during high-speed rotation by reducing the seal torque, it is also possible to reduce pressure fluctuation within the bearing, and prevent the adhesion of the seal lip 101a to the seal sliding surface 100a.

Also, with the ball bearing of the twelfth embodiment, since the particle sizes of foreign objects capable of passing through the oil paths between the circumferentially adjacent elastic protrusions 101b can be determined based on the heights of the elastic protrusions 101b, it is also possible to prevent the entry of foreign objects having predetermined particle sizes.

While, in each of the above eleventh and twelfth embodiments, the protrusions are formed on the opposed portion of the engaging member, two or more such protrusions may be formed on the side surface of the cage on its other axial side, with the circular annular surface formed on the opposed portion of the engaging member. In this case, if the circular annular surface on the opposed portion is formed as a portion of the elastomer, the protrusions on the cage will be wedged into the circular annular surface by an induced thrust load, so that the seal torque may increase. Therefore, the circular annular surface on the opposed portion is preferably formed as a portion of the metal core.

Also, in each of the above ninth to twelfth embodiments, the engaging member is attached to the outer bearing ring, but may be attached to the inner bearing ring instead.

Also, while, in each of the ninth to twelfth embodiments, as the mounting structure of the engaging member, the proximal end portion of the engaging member, the shield groove, and the seal groove were all of general ones, if such a general proximal end portion cannot be fixed in the general shield or seal groove, while resisting an induced thrust load, a shield/seal groove and a proximal end portion may be used which are specially designed such that the other axial side of the shield/seal groove, which receives an induced thrust load, reduce radial component forces which tend to push the proximal end portion of the engaging member toward the other bearing ring (inner bearing ring), thereby making it difficult for the proximal end portion to move out of the shield/seal groove. For example, a shield/seal groove and a proximal end portion may be used which are specially designed such that the contact surfaces of the proximal end portion of the engaging member and the other axial side of the shield/seal groove are each inclined, at an inclination angle of 10 degrees or less, in the other axial direction and radially toward the other bearing ring. In this case, in order to easily discharge chips generated when forming the shield/seal groove by grinding with a rotary grinder, the shield/seal groove preferably has its side surface on the one axial side thereof inclined in the one axial direction and radially inwardly, at an inclination angle larger than the inclination angles of the above contact surfaces.

Also, while the ball bearing includes only a single cage in each of the ninth to twelfth embodiments, the ball bearing may include two cages disposed on both sides of the balls. Since the bearing ring has shield/seal grooves on both sides thereof, two engaging members may be attached to restrict the respective cages. When the balls are received in the pockets of the two cages, in order to prevent the cages from interfering with each other, the depths H of the pockets are preferably set to be smaller than 0.5d so that, even when the cages are placed on both sides of the balls, the cages do not axially abut against each other.

Also, while in each of the ninth to twelfth embodiments, standard bearing rings, i.e., bearing rings having, on both sides of the raceway surface, shoulders equal in height to each other are used as the bearing rings of the deep groove ball bearing, bearing rings having shoulders different in height from each other may be used instead.

The above-described embodiments are mere examples in every respect, and the present invention is not limited thereto. Therefore, the scope of the present invention is indicated not by the above description but by the claims, and should be understood to include all modifications within the scope and meaning equivalent to the scope of the claims.

DESCRIPTION OF REFERENCE NUMERALS 1, 41, 71, 81, 91: Outer bearing ring
1a, 41a, 81a, 91a: Outer raceway surface
1b, 31b, 42d, 71a: Engaging portion
1c, 31c, 42e, 71b: Groove
1d: Receiving surface
1g: Chamfer
2, 31, 42, 82, 92, 100: Inner bearing ring
2a, 31a, 42a, 82a, 92a: Inner raceway surface
3, 10, 20, 30, 40, 50, 60, 70, 83, 93: Cage
3a, 40a, 70a, 83a, 93a: Pocket
3b, 10a, 20a, 30a, 40b, 50a, 60a, 70b: Engagement portion
4, 84, 94: Ball
41b, 41c: Outer shoulder
42b, 42c: Inner shoulder
50b, 60b: Protrusion
81b: Shield groove
83g, 95f: Protrusion
85, 95, 101: Engaging member
85b, 95e: Opposed portion
85d: Rib
91b: Seal groove
95a: Metal core
95b: Elastomer
95d, 101a: Seal lip
100a: Seal sliding surface
101b: Elastic protrusion
B, 80, 90: Ball bearing

The invention claimed is:

1. A ball bearing comprising:
an outer bearing ring having an outer raceway surface on an inner periphery of the outer bearing ring;
an inner bearing ring having an inner raceway surface on an outer periphery of the inner bearing ring;
a plurality of balls disposed between the outer raceway surface and the inner raceway surface; and
a cage which is made of a resin, and by which the balls are arranged at equal intervals in a circumferential direction,
wherein the cage has, in plural circumferential portions of the cage, pockets maintaining circumferential positions of the balls,
wherein the pockets are open to a side surface of the cage on one side thereof in a first axial direction,
wherein at least one bearing ring of the outer bearing ring and the inner bearing ring includes a radially protruding engaging portion at a position of the inner or outer periphery thereof on one side of the raceway surface thereof, in a second axial direction,
wherein the cage includes at least one engagement portion engageable with the radially protruding engaging portion in the second axial direction,
wherein a relationship between a pocket axial depth H of each of the pockets and a ball diameter d of a corresponding one of the balls is $0.15d \leq H \leq 0.65d$,
wherein the at least one engagement portion is disposed on one side of the pockets, in the second axial direction,
wherein the at least one engagement portion includes protrusions defining, between the protrusions and the radially protruding engaging portion, a space which narrows in axial dimension in the circumferential direction, and
wherein an axial clearance is defined between the radially protruding engaging portion and axial distal ends of the protrusions.

2. The ball bearing according to claim 1, wherein the relationship between the pocket axial depth H of each of the pockets and the ball diameter d of the corresponding one of the balls is $0.15d \leq H \leq 0.5d$.

3. The ball bearing according to claim 1, wherein the at least one engagement portion of the cage comprises two or more engagement portions disposed at two or more circumferentially spaced apart portions of the cage.

4. The ball bearing according to claim 1, wherein the outer bearing ring includes the radially protruding engaging portion, wherein the at least one engagement portion is disposed on an outer periphery of the cage, and wherein the radially protruding engaging portion has a chamfer of which a diameter increases in the second axial direction.

5. The ball bearing according to claim 1, wherein the outer bearing ring includes the radially protruding engaging portion, wherein the at least one engagement portion is disposed on an outer periphery of the cage, wherein the at least one engagement portion has a diameter that decreases from a distal end of the at least one engagement portion in the first axial direction, and wherein the distal end of the at least one engagement portion is a radially outermost portion of the at least one engagement portion, which is a portion of the cage engageable with the radially protruding engaging portion in the second axial direction.

6. The ball bearing according to claim 1, wherein the radially protruding engaging portion has a receiving surface inclined, at an inclination angle of 10 degrees or less, in the second axial direction and radially toward a distal end of the radially protruding engaging portion, and wherein the at least one engagement portion is engageable with the receiving surface in the second axial direction.

7. The ball bearing according to claim 1, wherein the at least one bearing ring of the outer bearing ring and the inner bearing ring has a groove at a position of the inner or outer periphery thereof on the one side of the raceway surface thereof, in the second axial direction, the groove having a depth in a radial direction, and extending continuously around an entire circumference of the at least one bearing ring of the outer bearing ring and the inner bearing ring, and wherein the radially protruding engaging portion constitutes, of the inner or outer periphery having the raceway surface, a portion from an end thereof in the second axial direction to a bottom of the groove.

8. The ball bearing according to claim 1, wherein each of the outer bearing ring and the inner bearing ring includes the radially protruding engaging portion, and wherein the at least one engagement portion includes each of an outer engagement portion and an inner engagement portion, the outer engagement portion corresponding to the radially protruding engaging portion of the outer bearing ring, and the inner engagement portion corresponding to the radially protruding engaging portion of the inner bearing ring.

9. The ball bearing according to claim 1, wherein the cage is formed of an engineering plastic.

10. The ball bearing according to claim 1, wherein the inner bearing ring includes the radially protruding engaging portion, wherein the at least one engagement portion is disposed on an inner periphery of the cage, and wherein the radially protruding engaging portion has a chamfer of which a diameter decreases in the second axial direction.

11. The ball bearing according to claim 1, wherein the inner bearing ring includes the radially protruding engaging portion, wherein the at least one engagement portion is disposed on an inner periphery of the cage, wherein the at least one engagement portion has a diameter that increases from a distal end of the at least one engagement portion in the first axial direction, and wherein the distal end of the at least one engagement portion is a radially innermost portion of the at least one engagement portion, which is a portion of the cage engageable with the radially protruding engaging portion in the second axial direction.

12. A ball bearing comprising:
an outer bearing ring having an outer raceway surface on an inner periphery of the outer bearing ring;
an inner bearing ring having an inner raceway surface on an outer periphery of the inner bearing ring;
a plurality of balls disposed between the outer raceway surface and the inner raceway surface; and
a cage which is made of a resin, and by which the balls are arranged at equal intervals in a circumferential direction,
wherein the cage has, in plural circumferential portions of the cage, pockets maintaining circumferential positions of the balls,
wherein the pockets are open to a side surface of the cage on one side thereof in a first axial direction,
wherein at least one bearing ring of the outer bearing ring and the inner bearing ring includes a radially protruding engaging portion at a position of the inner or outer periphery thereof on one side of the raceway surface thereof, in a second axial direction,
wherein the cage includes at least one engagement portion engageable with the radially protruding engaging portion in the second axial direction,
wherein a relationship between a pocket axial depth H of each of the pockets and a ball diameter d of a corresponding one of the balls is $0.15d \leq H \leq 0.65d$,
wherein the at least one engagement portion is disposed on one side of the pockets, in the second axial direction,
wherein an axial clearance is defined between the at least one engagement portion and the radially protruding engaging portion, and
wherein, the at least one engagement portion and the radially protruding engaging portion have two surfaces, respectively, which are circumferentially slidable relative each other, the two surfaces each having an arithmetic mean roughness Ra of 0.2 μm or less.

13. A ball bearing comprising:
an outer bearing ring having an outer raceway surface;
an inner bearing ring having an inner raceway surface;
an engaging member attached to one bearing ring of the outer bearing ring and the inner bearing ring;
a plurality of balls disposed between the outer raceway surface and the inner raceway surface; and
a cage which is made of a resin, and by which the balls are arranged at equal intervals in a circumferential direction,
wherein the cage has, at a plurality of circumferential portions of the cage, pockets maintaining circumferential positions of the balls,
wherein the pockets are open to a side surface of the cage on its side in one a first side in a first axial direction,
wherein the engaging member includes an opposed portion disposed on a second side of the cage in a second axial direction so as to restrict movement of the cage in the second axial direction,
wherein a relationship between a pocket axial depth H of each of the pockets and a ball diameter d of a corresponding one of the balls is $0.15d \leq H \leq 0.65d$,
wherein an axial clearance is defined between the engaging member and the cage,
wherein one of the cage and the opposed portion of the engaging member includes two or more protrusions each defining, between the protrusion and the other of the cage and the opposed portion of the engaging member, a space which narrows in axial dimension in the circumferential direction, and wherein the two or more protrusions are spaced apart from each other in the circumferential direction.

14. The ball bearing according to claim 13, wherein the relationship between the pocket axial depth H of each of the pockets and the ball diameter d of the corresponding one of the balls is 0.15d≤H≤0.5d.

15. The ball bearing according to claim 13, wherein the two or more protrusions are formed on the cage.

16. The ball bearing according to claim 15, wherein the one bearing ring of the outer bearing ring and the inner bearing ring has, on one side of the raceway surface of the one bearing ring of the outer bearing ring and the inner bearing ring, in the second axial direction, a shield groove having a depth in a radial direction, and extending continuously around an entire circumference of the one bearing ring of the outer bearing ring and the inner bearing ring, and wherein the engaging member comprises a shield formed of a metal plate, and attached to the shield groove.

17. The ball bearing according to claim 16, wherein the opposed portion of the engaging member includes a rib formed on the metal plate so as to define a circumferentially extending groove.

18. The ball bearing according to claim 13, wherein the cage is formed of an engineering plastic.

19. A ball bearing comprising:
an outer bearing ring having an outer raceway surface;
an inner bearing ring having an inner raceway surface;
an engaging member attached to one bearing ring of the outer bearing ring and the inner bearing ring;
a plurality of balls disposed between the outer raceway surface and the inner raceway surface; and
a cage which is made of a resin, and by which the balls are arranged at equal intervals in a circumferential direction,
wherein the cage has, at a plurality of circumferential portions of the cage, pockets maintaining circumferential positions of the balls,
wherein the pockets are open to a side surface of the cage on a first side in a first axial direction,
wherein the engaging member includes an opposed portion disposed on a second side of the cage in a second axial direction so as to restrict movement of the cage in the second axial direction,
wherein a relationship between a pocket axial depth H of each of the pockets and a ball diameter d of a corresponding one of the balls is 0.15d≤H≤0.65d,
wherein the one bearing ring of the outer bearing ring and the inner bearing ring has, on one side of the raceway surface of the one bearing ring of the outer bearing ring and the inner bearing ring, in the second axial direction, a seal groove having a depth in a radial direction, and extending continuously around an entire circumference of the one bearing ring of the outer bearing ring and the inner bearing ring, and
wherein the engaging member comprises a seal attached to the seal groove, constituted by:
a metal core formed of a metal plate; and
an elastomer attached to the metal core.

20. The ball bearing according to claim 19, wherein an axial clearance is defined between the engaging member and the cage,
wherein one of the cage and the opposed portion of the engaging member includes two or more protrusions each defining, between the two or more protrusions and the other of the cage and the opposed portion, a space which narrows in axial dimension in the circumferential direction, and
wherein the two or more protrusions are spaced apart from each other in the circumferential direction.

21. The ball bearing according to claim 20, wherein the opposed portion of the engaging member includes the two or more protrusions, the two or more protrusions being portions of the elastomer.

22. The ball bearing according to claim 19, wherein the other bearing ring of the outer bearing ring and the inner bearing ring, which is opposed to the one bearing ring of the outer bearing ring and the inner bearing ring, has a seal sliding surface extending continuously around an entire circumference of the other bearing ring of the outer bearing ring and the inner bearing ring,
wherein the engaging member includes a seal lip which is a portion of the elastomer and circumferentially slidable relative to the seal sliding surface, and
wherein the seal lip includes two or more elastic protrusions each defining, between the elastic protrusion and the seal sliding surface, a space which narrows in radial dimension in the circumferential direction, and the two or more elastic protrusions are spaced apart from each other in the circumferential direction, to define, between respective circumferentially adjacent pairs of the two or more elastic protrusions, oil paths communicating with an interior of the ball bearing and an exterior of the ball bearing.

\* \* \* \* \*